US011004459B2

(12) United States Patent
Hartung et al.

(10) Patent No.: US 11,004,459 B2
(45) Date of Patent: *May 11, 2021

(54) ENVIRONMENTAL CONDITION DETECTION

(71) Applicant: Sonos, Inc., Santa Barbara, CA (US)

(72) Inventors: Klaus Hartung, Santa Barbara, CA (US); Greg Bright, Santa Barbara, CA (US)

(73) Assignee: Sonos, Inc., Santa Barbara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/570,009

(22) Filed: Sep. 13, 2019

(65) Prior Publication Data

US 2020/0005808 A1  Jan. 2, 2020

Related U.S. Application Data

(63) Continuation of application No. 15/718,579, filed on Sep. 28, 2017, now Pat. No. 10,418,050, which is a
(Continued)

(51) Int. Cl.
*G10L 25/30* (2013.01)
*H04R 3/04* (2006.01)
(Continued)

(52) U.S. Cl.
CPC ............... *G10L 25/30* (2013.01); *H04R 3/04* (2013.01); *H04R 27/00* (2013.01); *H04R 29/007* (2013.01);
(Continued)

(58) Field of Classification Search
CPC ........... G10L 25/30; H04R 3/04; H04R 27/00; H04R 29/007; H04R 2227/005;
(Continued)

(56) References Cited

U.S. PATENT DOCUMENTS

| 5,440,644 A | 8/1995 | Farinelli et al. |
| 5,761,320 A | 6/1998 | Farinelli et al. |

(Continued)

FOREIGN PATENT DOCUMENTS

| EP | 1389853 A1 | 2/2004 |
| WO | 200153994 | 7/2001 |
| WO | 2003093950 A2 | 11/2003 |

OTHER PUBLICATIONS

AudioTron Quick Start Guide, Version 1.0, Mar. 2001, 24 pages.
(Continued)

*Primary Examiner* — Akelaw Teshale
(74) *Attorney, Agent, or Firm* — Akerman LLP

(57) ABSTRACT

Examples described herein involve detecting known environmental conditions of using a neural network. An example implementation involves a playback device receiving data indicating a response of a listening environment to audio output of one or more playback devices as captured by a microphone and determining an input vector for a neural network. The playback device provides the determined input vector to the neural network, which includes an output layer comprising neurons that correspond to respective environmental conditions. The playback device detects that the input vector caused one or more neurons of the neural network to fire such that the neural network indicates that one or more particular environmental conditions are present in the listening environment. The playback device adjusts audio output of the one or more playback devices to at least partially offset the one or more particular environmental conditions.

20 Claims, 9 Drawing Sheets

Related U.S. Application Data continuation of application No. 14/864,533, filed on Sep. 24, 2015, now Pat. No. 9,779,759.

(60) Provisional application No. 62/220,158, filed on Sep. 17, 2015.

(51) Int. Cl.

| | |
|---|---|
| *H04S 7/00* | (2006.01) |
| *H04R 27/00* | (2006.01) |
| *H04R 29/00* | (2006.01) |
| *G06N 3/08* | (2006.01) |
| *G06N 3/02* | (2006.01) |

(52) U.S. Cl.
CPC ............... *H04S 7/301* (2013.01); *G06N 3/02* (2013.01); *G06N 3/084* (2013.01); *H04R 2227/005* (2013.01)

(58) Field of Classification Search
CPC ...... H04S 7/301; H04S 2400/11; H04S 7/304; H04S 2400/01; H04S 2400/13; H04S 2420/01; H04S 2400/15; H04S 3/008; H04S 7/303; H04S 1/007; H04S 2420/07; H04S 2420/11; H04S 3/004; H04S 7/30; G06N 3/084; G06N 3/02; G06N 20/00; G06N 3/0454; G06N 3/0445; G06N 3/0472; G06N 3/088; G06N 7/005; G06N 3/006; G06N 3/08; G06N 3/126; G06N 5/046; G06N 3/086; G06N 3/04; G06N 3/063; G06N 3/0418; G06N 3/0481; G06N 3/082; G06N 5/04; G06N 20/20; G06N 3/004; G06N 3/0436; G06N 5/003; G06N 5/025; G06N 5/045
See application file for complete search history.

(56) References Cited

U.S. PATENT DOCUMENTS

| | | | |
|---|---|---|---|
| 5,923,902 A | 7/1999 | Inagaki | |
| 6,032,202 A | 2/2000 | Lea et al. | |
| 6,256,554 B1 | 7/2001 | DiLorenzo | |
| 6,404,811 B1 | 6/2002 | Cvetko et al. | |
| 6,469,633 B1 | 10/2002 | Wachter | |
| 6,522,886 B1 | 2/2003 | Youngs et al. | |
| 6,601,049 B1* | 7/2003 | Cooper | G06N 3/0454 706/15 |
| 6,601,054 B1* | 7/2003 | Lo | G05B 5/01 706/30 |
| 6,611,537 B1 | 8/2003 | Edens et al. | |
| 6,631,410 B1 | 10/2003 | Kowalski et al. | |
| 6,675,145 B1* | 1/2004 | Yehia | G10L 15/00 704/270 |
| 6,757,517 B2 | 6/2004 | Chang et al. | |
| 6,778,869 B2 | 8/2004 | Champion | |
| 7,130,608 B2 | 10/2006 | Hollstrom et al. | |
| 7,130,616 B2 | 10/2006 | Janik | |
| 7,143,939 B2 | 12/2006 | Henzerling | |
| 7,236,773 B2 | 6/2007 | Thomas | |
| 7,295,548 B2 | 11/2007 | Blank et al. | |
| 7,391,791 B2 | 6/2008 | Balassanian et al. | |
| 7,483,538 B2 | 1/2009 | McCarty et al. | |
| 7,571,014 B1 | 8/2009 | Lambourne et al. | |
| 7,630,501 B2 | 12/2009 | Blank et al. | |
| 7,643,894 B2 | 1/2010 | Braithwaite et al. | |
| 7,657,910 B1 | 2/2010 | McAulay et al. | |
| 7,853,341 B2 | 12/2010 | McCarty et al. | |
| 7,987,294 B2 | 7/2011 | Bryce et al. | |
| 8,014,423 B2 | 9/2011 | Thaler et al. | |
| 8,045,952 B2 | 10/2011 | Qureshey et al. | |
| 8,103,009 B2 | 1/2012 | McCarty et al. | |
| 8,234,395 B2 | 7/2012 | Millington | |
| 8,483,853 B1 | 7/2013 | Lambourne | |
| 8,942,252 B2 | 1/2015 | Balassanian et al. | |
| 2001/0042107 A1 | 11/2001 | Palm | |
| 2002/0022453 A1 | 2/2002 | Balog et al. | |
| 2002/0026442 A1 | 2/2002 | Lipscomb et al. | |
| 2002/0124097 A1 | 9/2002 | Isely et al. | |
| 2003/0142832 A1* | 7/2003 | Meerkoetter | H04R 29/003 381/59 |
| 2003/0157951 A1 | 8/2003 | Hasty | |
| 2004/0024478 A1 | 2/2004 | Hans et al. | |
| 2007/0142944 A1* | 6/2007 | Goldberg | G10H 1/40 700/94 |
| 2008/0037804 A1* | 2/2008 | Shmunk | H04R 3/04 381/96 |
| 2011/0161267 A1* | 6/2011 | Chowdhary | G06N 3/08 706/21 |
| 2011/0237295 A1* | 9/2011 | Bartkowiak | H04R 25/505 455/556.1 |
| 2013/0329896 A1 | 12/2013 | Krishnaswamy et al. | |
| 2015/0120289 A1* | 4/2015 | Lev-Tov | G10L 15/02 704/231 |
| 2015/0223004 A1* | 8/2015 | Deprez | H04S 7/301 381/303 |
| 2015/0235637 A1* | 8/2015 | Casado | G10L 15/222 704/235 |
| 2015/0242180 A1* | 8/2015 | Boulanger Lewandowski | G06N 3/0445 700/94 |

OTHER PUBLICATIONS

AudioTron Reference Manual, Version 3.0, May 2002, 70 pages.
AudioTron Setup Guide, Version 3.0, May 2002, 38 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Co-pending U.S. Appl. No. 14/481,514, filed Sep. 9, 2014.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
European Patent Office, European Search Report dated Sep. 20, 2019, issued in connection with European Application No. 19170662.1, 5 pages.
International Searching Authority, International Search Report and Written Opinion dated Jan. 12, 2017, issued in connection with International Application No. PCT/US2016/052258, filed on Sep. 16, 2016, 11 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Non-Final Office Action dated Jan. 4, 2017, issued in connection with U.S. Appl. No. 14/864,533, filed Sep. 24, 2015, 16 pages.
Notice of Allowance dated May 13, 2019, issued in connection with U.S. Appl. No. 15/718,579, filed Sep. 28, 2017, 17 pages.
Notice of Allowance dated Jun. 30, 2017, issued in connection with U.S. Appl. No. 14/864,533, filed Sep. 24, 2015, 10 pages.
Palm, Inc., "Handbook for the Palm VII Handheld," May 2000, 311 pages.
Presentations at WinHEC 2000, May 2000, 138 pages.
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.

(56) References Cited

OTHER PUBLICATIONS

UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

* cited by examiner

ENVIRONMENTAL CONDITION DETECTION

CROSS REFERENCE TO RELATED APPLICATIONS

This application claims priority under 35 U.S.C. § 120 to, and is a continuation of, U.S. non-provisional patent application Ser. No. 15/718,579, filed on Sep. 28, 2017, entitled "Device Impairment Detection," which is incorporated herein by reference in its entirety.

U.S. non-provisional patent application Ser. No. 15/718,579 claims priority under 35 U.S.C. § 120 to, and is a continuation of, U.S. non-provisional patent application Ser. No. 14/864,533, filed on Sep. 24, 2015, entitled "Device Impairment Detection" and issued as U.S. Pat. No. 9,779,759 on Oct. 3, 2017, which is incorporated herein by reference in its entirety.

U.S. non-provisional patent application Ser. No. 14/864,533 claims priority to U.S. provisional Patent Application No. 62/220,158, filed on Sep. 17, 2015, entitled "Detecting impairments of a microphone measurement or audio recording," which is also incorporated herein by reference in its entirety.

FIELD OF THE DISCLOSURE

The disclosure is related to consumer goods and, more particularly, to methods, systems, products, features, services, and other elements directed to media playback or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The Sonos Wireless HiFi System enables people to experience music from a plethora of sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

Figure 1:
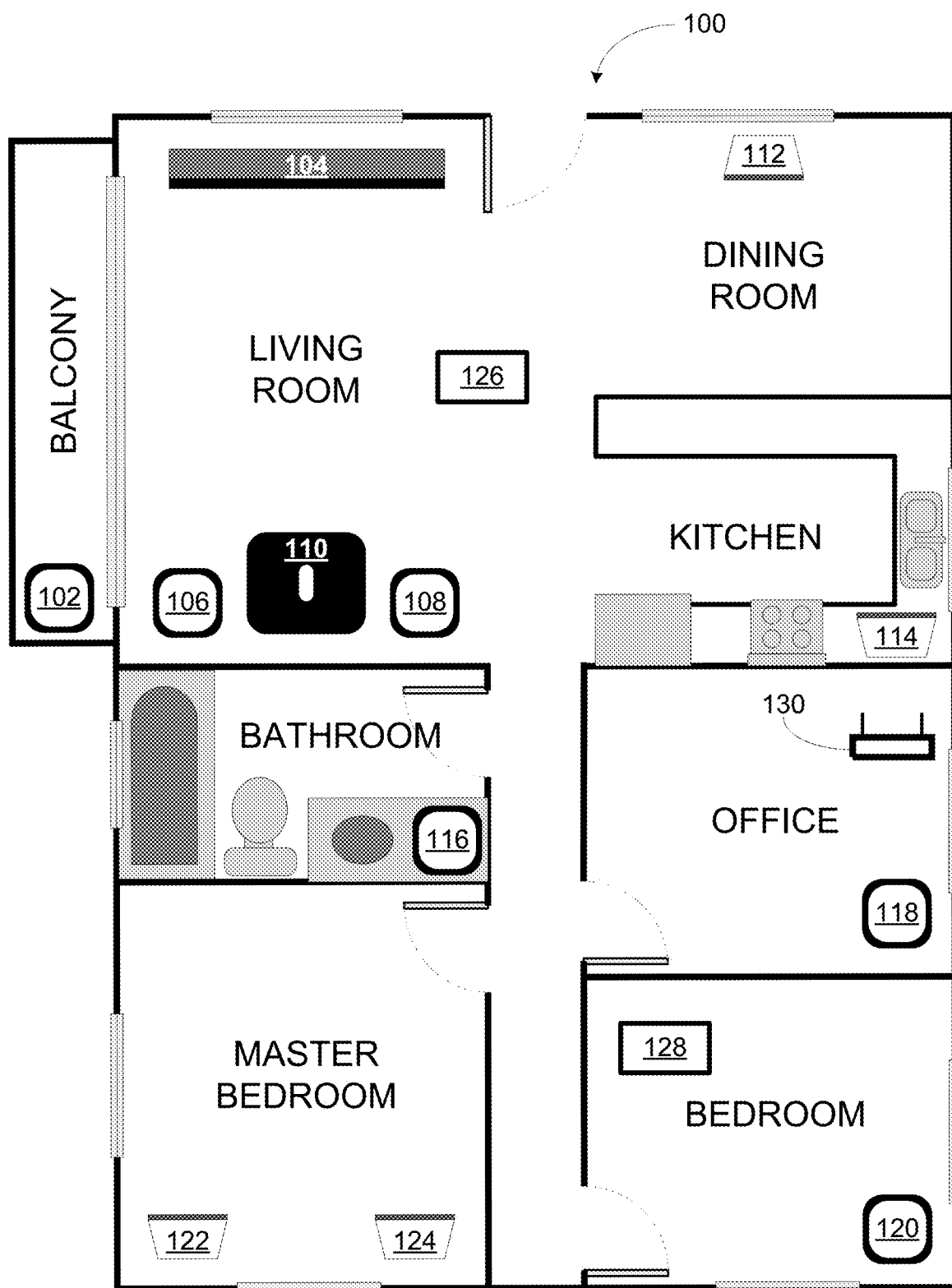
FIG. 1 shows an example media playback system configuration in which certain embodiments may be practiced.

The drawings are for the purpose of illustrating example embodiments, but it is understood that the inventions are not limited to the arrangements and instrumentality shown in the drawings.

DETAILED DESCRIPTION

I. Overview

Embodiments described herein may involve, inter alia, detecting one or more impairments that might affect calibration of one or more playback devices of a media playback system. Some calibration procedures contemplated herein involve a recording device (e.g., a smartphone or other portable computing device) detecting and analyzing sound (e.g., one or more calibration sounds) emitted by one or more playback devices in a given listening environment. By analyzing sound that has propagated through the listening environment, a media playback system may determine how the listening environment is affecting sound emitted by the playback device(s) and perhaps also how to address the effect of the listening environment on the playback device(s). For example, the media playback system may determine a calibration profile that adjusts the output frequency of a playback device to offset the acoustics of the environment.

However, in some circumstances, one or more impairments may interfere with aspects of a calibration procedure (e.g., the emitting of calibration sound(s) by one or more playback devices or the recording of those calibration sounds by the recording device). Possible impairments that might be detected by the disclosed techniques include, but are not limited to object(s) or obstruction(s) at least partially covering or otherwise obstructing or affecting sound emitted by one or more speakers of a playback device or other device as the sound is being used to emit audio in connection with a playback device calibration procedure. Further possible impairments that could be detected by the disclosed techniques include, but are not limited to object(s) or obstruction(s) at least partially covering or otherwise obstructing or affecting sound as the sound is detected by one or more microphones of a recording device, playback device, or other device that is being used to record audio in connection with a playback device calibration procedure.

Such objects and/or obstructions may include, for example, (i) a user's finger at least partially covering (typically inadvertently) one or more microphones that are being used to detect, monitor, and/or record sound as part of the calibration procedure, (ii) a smartphone case at least partially covering or enclosing one or more smartphone microphones that are being used to detect, monitor, and/or record sound as part of the calibration procedure, (iii) lint, dust, or other debris on or in one or more microphones being used to detect, monitor, and/or record sound in connection with the calibration procedure (generally referred to as "flint"), (iv) objects that are on a table, shelf, or wall near the device comprising one or more of the microphones that are being used to emit and/or record sound in connection with the calibration procedure, and/or (v) other object(s) and/or (vi) other object(s) and/or obstruction(s) that tend to affect sound waves received by the one or more microphones being used to detect, monitor, and/or record sound in connection with the calibration procedure.

After detecting an impairment, some embodiments may further include one or more of (a) indicating to a user visually (via a control device or playback device), or audibly (via controller or audio playback device), that an impairment has been detected by visual or other means and/or (b) correcting the calibration to offset the detected impairment. In some embodiments, the action taken may vary depending on the type of impairment detected. For example, for impairments that can be corrected, the techniques disclosed herein may correct or compensate for the impairment. For other impairments (e.g., impairments that cannot be readily offset), the systems and methods disclosed herein may include the control device or playback device notifying a user (via a visible, audible, physical (e.g., vibration), or other notification) of the detected (or suspected) impairment so that the user can take action to correct or remove the impairment. The notification may also include instructions or suggestions for correcting the detected (or suspected) impairment.

Example embodiments contemplated herein utilize a neural network to detect impairments. An example neural network includes a plurality of neurons corresponding to an impairment (or lack thereof). Each neuron implements a transfer function that produces an output indicative of a "firing" of the neuron when an input vector characteristic of an impaired system is provided as input to the neuron. In this way, firing of a neuron indicates that a particular impairment that corresponds to the firing neuron is present. In some cases, wherein multiple impairments are present, a given input vector may cause multiple neurons to fire thereby indicating the present of two or more particular impairments.

As noted above, one or more input vectors may be provided as input to the neural network so as to detect presence of impairments. Such input vectors may be particular vectors derived to represent, in a computationally-efficient manner, the complex system of playback device(s) and recording device(s) operating in a listening area with unknown characteristics.

To obtain such an input vector, a recording device (e.g., a smartphone) may record audio (e.g., a test tone) emitted by one or more playback devices in a given listening area. A processing device (referred to generally herein as a network device or a control device and which may include the recording device) may generate a "response" indicative of this system (e.g. a power spectral density). This response may be represented as a vector (e.g., a response vector) that includes components which represent the response of the system in respective frequency ranges. For instance, an example response vector may include 8000 components, each component representing power density of the recorded audio within a respective range of frequencies.

The input vector may be determined from the response vector by projecting the input vector onto a principle component matrix that represents variance caused by the known impairments that the neural network is trained to detect. During training of the neural network, a recording device may record audio (e.g., a test tone) emitted by a playback device both with and without each known impairment present to generate a matrix of responses under a range of iterations. From this matrix of responses, a processing device may extract principle components, which are eigenvectors representing the axes of greatest variance in the matrix of responses. These principle component vectors are combined into a matrix (i.e., the principle component matrix).

While the techniques described here may have application to detecting impairments of a microphone or of a device, the techniques described herein may also have application to detecting conditions generally. For instance, the techniques described herein may be employed by devices of a media playback system (e.g., playback and/or control devices) to detect conditions present in an operating environment (e.g., the presence of conditions that affect operation of the media playback system), or the nature of the operating environment itself (e.g., indoors/outdoors, size of room, type of room, furnishings and/or finishes of the room, among other examples). Yet further, the techniques described herein may be applied by computing devices generally to detect various conditions (e.g., physical conditions) based on sensor data (e.g. radio frequency data, such as IEEE 802.11 WiFi data). Further, such techniques may be used in combination with other detection techniques (e.g., conventional detecting techniques based on sensor data) to increase confidence in the detection of known conditions.

As indicated above, embodiments described herein involve identifying one or more impairments affecting calibration of one or more playback devices. In one aspect, a network device is provided. The network device includes a microphone, one or more processors, and a tangible data storage having stored therein instructions executable by the one or more processors to cause the network device to perform operations. The operations include receiving data indicating a response of one or more playback devices captured by a given microphone. The operations further include determining an input vector by projecting a response vector that represents the response of the one or more playback devices onto a principle component matrix representing variance caused by one or more calibration impairments. The operations also include providing the determined input vector to a neural network that includes an output layer comprising neurons that correspond to respective calibration impairments. The operations include detecting that the input vector caused one or more neurons of the neural network to fire such that the neural network indicates that one or more particular calibration impairments are affecting the microphone and adjusting a calibration of the one or more playback devices to offset the one or more particular calibration impairments.

In another aspect, a method is provided. The method involves receiving data indicating a response of one or more playback devices captured by a given microphone. The method further involves determining an input vector by projecting a response vector that represents the response of the one or more playback devices onto a principle component matrix representing variance caused by one or more calibration impairments. The method also involves providing the determined input vector to a neural network that includes an output layer comprising neurons that correspond to respective calibration impairments. The method involves detecting that the input vector caused one or more neurons of the neural network to fire such that the neural network indicates that one or more particular calibration impairments are affecting the microphone and adjusting a calibration of the one or more playback devices to offset the one or more particular calibration impairments.

In another aspect, a non-transitory computer-readable medium is provided. The non-transitory computer-readable medium has stored thereon instructions executable by a computing device to perform operations. The operations include receiving data indicating a response of one or more playback devices captured by a given microphone. The operations further include determining an input vector by projecting a response vector that represents the response of the one or more playback devices onto a principle component matrix representing variance caused by one or more calibration impairments. The operations also include providing the determined input vector to a neural network that includes an output layer comprising neurons that correspond to respective calibration impairments. The operations include detecting that the input vector caused one or more neurons of the neural network to fire such that the neural network indicates that one or more particular calibration impairments are affecting the microphone and adjusting a calibration of the one or more playback devices to offset the one or more particular calibration impairments.

Further example embodiments described herein involve training a neural network to detect impairments or other conditions present in a system. In an aspect, a computing system is provided. The computing system includes one or more processors, and a tangible data storage having stored therein instructions executable by the one or more processors to cause the computing system to perform operations. The operations include receiving a response matrix that represents, in respective dimensions, responses of a given playback device under respective iterations of a sound captured by a recording device, the iterations including first iterations with respective impairments to the recording device and second iterations without the respective impairments to the recording device. The operations further include determining principle components representing the axes of greatest variance in the response matrix, the principle components comprising respective eigenvectors that include a component for each of the respective iterations. The operations also include determining a principle-component matrix that represents a given set of the principle components. The operations include determining a teaching matrix by projecting the principle-component onto the response matrix. The operations also include training a neural network that includes an output layer comprising a neuron for each of the respective impairments by iteratively providing vectors of the training matrix to the neural network and storing the trained neural network.

In an aspect, a method is provided. The method involves receiving a response matrix that represents, in respective dimensions, responses of a given playback device under respective iterations of a sound captured by a recording device, the iterations including first iterations with respective impairments to the recording device and second iterations without the respective impairments to the recording device. The method further involves determining principle components representing the axes of greatest variance in the response matrix, the principle components comprising respective eigenvectors that include a component for each of the respective iterations. The method also involves determining a principle-component matrix that represents a given set of the principle components. The method involves determining a teaching matrix by projecting the principle-component onto the response matrix. The method also involves training a neural network that includes an output layer comprising a neuron for each of the respective impairments by iteratively providing vectors of the training matrix to the neural network and storing the trained neural network.

In another aspect, a non-transitory computer-readable medium is provided. The non-transitory computer-readable medium has stored thereon instructions executable by a computing device to perform operations. The operations include receiving a response matrix that represents, in respective dimensions, responses of a given playback device under respective iterations of a sound captured by a recording device, the iterations including first iterations with respective impairments to the recording device and second iterations without the respective impairments to the recording device. The operations further include determining principle components representing the axes of greatest variance in the response matrix, the principle components comprising respective eigenvectors that include a component for each of the respective iterations. The operations also include determining a principle-component matrix that represents a given set of the principle components. The operations include determining a teaching matrix by projecting the principle-component onto the response matrix. The operations also include training a neural network that includes an output layer comprising a neuron for each of the respective impairments by iteratively providing vectors of the training matrix to the neural network and storing the trained neural network.

While some examples described herein may refer to functions performed by given actors such as "users" and/or other entities, it should be understood that this is for purposes of explanation only. The claims should not be interpreted to require action by any such example actor unless explicitly required by the language of the claims themselves. It will be understood by one of ordinary skill in the art that this disclosure includes numerous other embodiments.

II. Example Operating Environment

FIG. 1 shows an example configuration of a media playback system 100 in which one or more embodiments disclosed herein may be practiced or implemented. The media playback system 100 as shown is associated with an example home environment having several rooms and spaces, such as for example, a master bedroom, an office, a dining room, and a living room. As shown in the example of FIG. 1, the media playback system 100 includes playback devices 102-124, control devices 126 and 128, and a wired or wireless network router 130.

Further discussions relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback Devices

Figure 2:
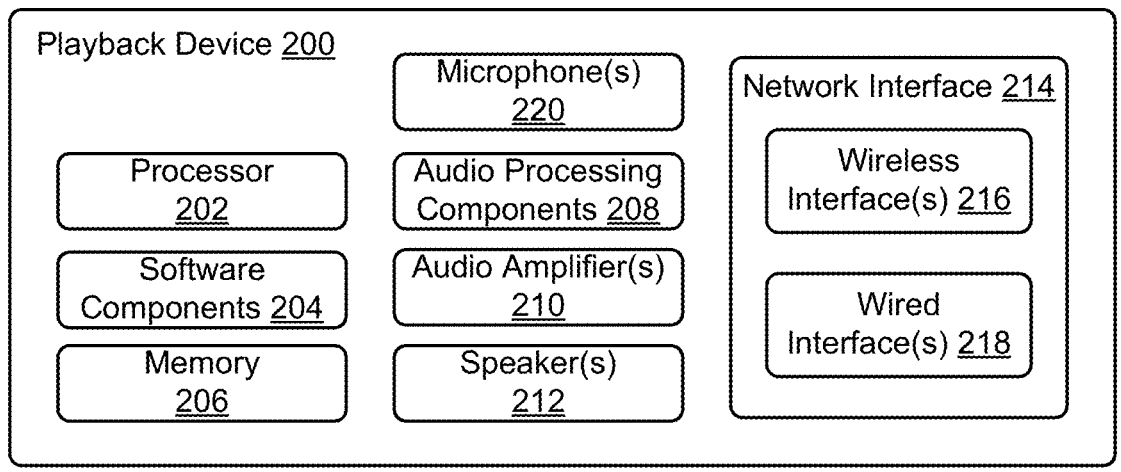
FIG. 2 shows a functional block diagram of an example playback device.

FIG. 2 shows a functional block diagram of an example playback device 200 that may be configured to be one or more of the playback devices 102-124 of the media playback system 100 of FIG. 1. The playback device 200 may include a processor 202, software components 204, memory 206, audio processing components 208, audio amplifier(s) 210, speaker(s) 212, microphone(s) 220, and a network interface 214 including wireless interface(s) 216 and wired interface(s) 218. In one case, the playback device 200 may not include the speaker(s) 212, but rather a speaker interface for connecting the playback device 200 to external speakers. In another case, the playback device 200 may include neither the speaker(s) 212 nor the audio amplifier(s) 210, but rather an audio interface for connecting the playback device 200 to an external audio amplifier or audio-visual receiver.

In one example, the processor 202 may be a clock-driven computing component configured to process input data according to instructions stored in the memory 206. The memory 206 may be a tangible computer-readable medium configured to store instructions executable by the processor 202. For instance, the memory 206 may be data storage that can be loaded with one or more of the software components 204 executable by the processor 202 to achieve certain functions. In one example, the functions may involve the playback device 200 retrieving audio data from an audio source or another playback device. In another example, the functions may involve the playback device 200 sending audio data to another device or playback device on a network. In yet another example, the functions may involve pairing of the playback device 200 with one or more playback devices to create a multi-channel audio environment.

Certain functions may involve the playback device 200 synchronizing playback of audio content with one or more other playback devices. During synchronous playback, a listener will preferably not be able to perceive time-delay differences between playback of the audio content by the playback device 200 and the one or more other playback devices. U.S. Pat. No. 8,234,395 entitled, "System and method for synchronizing operations among a plurality of independently clocked digital data processing devices," which is hereby incorporated by reference, provides in more detail some examples for audio playback synchronization among playback devices.

The memory 206 may further be configured to store data associated with the playback device 200, such as one or more zones and/or zone groups the playback device 200 is a part of, audio sources accessible by the playback device 200, or a playback queue that the playback device 200 (or some other playback device) may be associated with. The data may be stored as one or more state variables that are periodically updated and used to describe the state of the playback device 200. The memory 206 may also include the data associated with the state of the other devices of the media system, and shared from time to time among the devices so that one or more of the devices have the most recent data associated with the system. Other embodiments are also possible.

The audio processing components 208 may include one or more of digital-to-analog converters (DAC), analog-to-digital converters (ADC), audio preprocessing components, audio enhancement components, and a digital signal processor (DSP), among others. In one embodiment, one or more of the audio processing components 208 may be a subcomponent of the processor 202. In one example, audio content may be processed and/or intentionally altered by the audio processing components 208 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback by the playback device 200, the audio processing components 208 may be configured to process audio content to be sent to one or more other playback devices for playback.

Audio content to be processed and/or played back by the playback device 200 may be received from an external source, such as via an audio line-in input connection (e.g., an auto-detecting 3.5 mm audio line-in connection) or the network interface 214.

The microphone(s) 220 may include an audio sensor configured to convert detected sounds into electrical signals. The electrical signal may be processed by the audio processing components 208 and/or the processor 202. The microphone(s) 220 may be positioned in one or more orientations at one or more locations on the playback device 200. The microphone(s) 220 may be configured to detect sound within one or more frequency ranges. In one case, one or more of the microphone(s) 220 may be configured to detect sound within a frequency range of audio that the playback device 200 is capable or rendering. In another case, one or more of the microphone(s) 220 may be configured to detect sound within a frequency range audible to humans. Other examples are also possible.

The network interface 214 may be configured to facilitate a data flow between the playback device 200 and one or more other devices on a data network. As such, the playback device 200 may be configured to receive audio content over the data network from one or more other playback devices in communication with the playback device 200, network devices within a local area network, or audio content sources over a wide area network such as the Internet. In one example, the audio content and other signals transmitted and received by the playback device 200 may be transmitted in the form of digital packet data containing an Internet Protocol (IP)-based source address and IP-based destination addresses. In such a case, the network interface 214 may be configured to parse the digital packet data such that the data destined for the playback device 200 is properly received and processed by the playback device 200.

As shown, the network interface 214 may include wireless interface(s) 216 and wired interface(s) 218. The wireless interface(s) 216 may provide network interface functions for the playback device 200 to wirelessly communicate with other devices (e.g., other playback device(s), speaker(s), receiver(s), network device(s), control device(s) within a data network the playback device 200 is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 218 may provide network interface functions for the playback device 200 to communicate over a wired connection with other devices in accordance with a communication protocol (e.g., IEEE 802.3). While the network interface 214 shown in FIG. 2 includes both wireless interface(s) 216 and wired interface(s) 218, the network interface 214 may in some embodiments include only wireless interface(s) or only wired interface(s).

In one example, the playback device 200 and one other playback device may be paired to play two separate audio components of audio content. For instance, playback device 200 may be configured to play a left channel audio component, while the other playback device may be configured to play a right channel audio component, thereby producing or enhancing a stereo effect of the audio content. The paired playback devices (also referred to as "bonded playback devices") may further play audio content in synchrony with other playback devices.

In another example, the playback device 200 may be sonically consolidated with one or more other playback devices to form a single, consolidated playback device. A consolidated playback device may be configured to process and reproduce sound differently than an unconsolidated playback device or playback devices that are paired, because a consolidated playback device may have additional speaker drivers through which audio content may be rendered. For instance, if the playback device 200 is a playback device designed to render low frequency range audio content (i.e. a subwoofer), the playback device 200 may be consolidated with a playback device designed to render full frequency range audio content. In such a case, the full frequency range playback device, when consolidated with the low frequency playback device 200, may be configured to render only the mid and high frequency components of audio content, while the low frequency range playback device 200 renders the low frequency component of the audio content. The consolidated playback device may further be paired with a single playback device or yet another consolidated playback device.

By way of illustration, SONOS, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2 or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 100 of FIG. 1, the environment may have one or more playback zones, each with one or more playback devices. The media playback system 100 may be established with one or more playback zones, after which one or more zones may be added, or removed to arrive at the example configuration shown in FIG. 1. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 1, the balcony, dining room, kitchen, bathroom, office, and bedroom zones each have one playback device, while the living room and master bedroom zones each have multiple playback devices. In the living room zone, playback devices 104, 106, 108, and 110 may be configured to play audio content in synchrony as individual playback devices, as one or more bonded playback devices, as one or more consolidated playback devices, or any combination thereof. Similarly, in the case of the master bedroom, playback devices 122 and 124 may be configured to play audio content in synchrony as individual playback devices, as a bonded playback device, or as a consolidated playback device.

In one example, one or more playback zones in the environment of FIG. 1 may each be playing different audio content. For instance, the user may be grilling in the balcony zone and listening to hip hop music being played by the playback device 102 while another user may be preparing food in the kitchen zone and listening to classical music being played by the playback device 114. In another example, a playback zone may play the same audio content in synchrony with another playback zone. For instance, the user may be in the office zone where the playback device 118 is playing the same rock music that is being playing by playback device 102 in the balcony zone. In such a case, playback devices 102 and 118 may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100 may be dynamically modified, and in some embodiments, the media playback system 100 supports numerous configurations. For instance, if a user physically moves one or more playback devices to or from a zone, the media playback system 100 may be reconfigured to accommodate the change(s). For instance, if the user physically moves the playback device 102 from the balcony zone to the office zone, the office zone may now include both the playback device 118 and the playback device 102. The playback device 102 may be paired or grouped with the office zone and/or renamed if so desired via a control device such as the control devices 126 and 128. On the other hand, if the one or more playback devices are moved to a particular area in the home environment that is not already a playback zone, a new playback zone may be created for the particular area.

Further, different playback zones of the media playback system 100 may be dynamically combined into zone groups or split up into individual playback zones. For instance, the dining room zone and the kitchen zone 114 may be combined into a zone group for a dinner party such that playback devices 112 and 114 may render audio content in synchrony. On the other hand, the living room zone may be split into a television zone including playback device 104, and a listening zone including playback devices 106, 108, and 110, if the user wishes to listen to music in the living room space while another user wishes to watch television.

c. Example Control Devices

Figure 3:
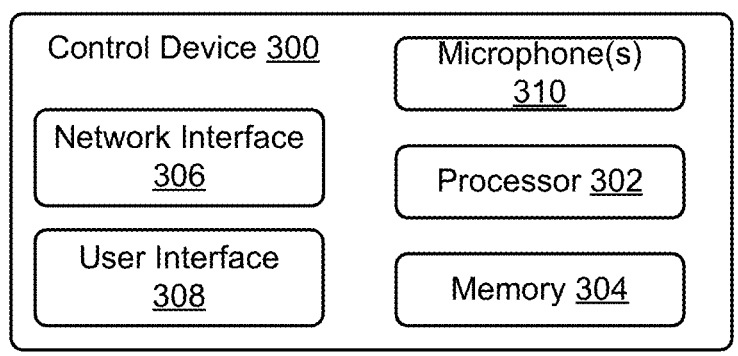
FIG. 3 shows a functional block diagram of an example control device.

FIG. 3 shows a functional block diagram of an example control device 300 that may be configured to be one or both of the control devices 126 and 128 of the media playback system 100. As shown, the control device 300 may include a processor 302, memory 304, a network interface 306, a user interface 308, and microphone(s) 310. In one example, the control device 300 may be a dedicated controller for the media playback system 100. In another example, the control device 300 may be a network device on which media playback system controller application software may be installed, such as for example, an iPhone™ iPad™ or any other smart phone, tablet or network device (e.g., a networked computer such as a PC or Mac™).

The processor 302 may be configured to perform functions relevant to facilitating user access, control, and configuration of the media playback system 100. The memory 304 may be configured to store instructions executable by the processor 302 to perform those functions. The memory 304 may also be configured to store the media playback system controller application software and other data associated with the media playback system 100 and the user.

The microphone(s) 310 may include an audio sensor configured to convert detected sounds into electrical signals. The electrical signal may be processed by the processor 302. In one case, if the control device 300 is a device that may also be used as a means for voice communication or voice recording, one or more of the microphone(s) 310 may be a microphone for facilitating those functions. For instance, the one or more of the microphone(s) 310 may be configured to detect sound within a frequency range that a human is capable of producing and/or a frequency range audible to humans. Other examples are also possible.

In one example, the network interface 306 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on). The network interface 306 may provide a means for the control device 300 to communicate with other devices in the media playback system 100. In one example, data and information (e.g., such as a state variable) may be communicated between control device 300 and other devices via the network interface 306. For instance, playback zone and zone group configurations in the media playback system 100 may be received by the control device 300 from a playback device or another network device, or transmitted by the control device 300 to another playback device or network device via the network interface 306. In some cases, the other network device may be another control device.

Playback device control commands such as volume control and audio playback control may also be communicated from the control device 300 to a playback device via the network interface 306. As suggested above, changes to configurations of the media playback system 100 may also be performed by a user using the control device 300. The configuration changes may include adding/removing one or more playback devices to/from a zone, adding/removing one or more zones to/from a zone group, forming a bonded or consolidated player, separating one or more playback devices from a bonded or consolidated player, among others. Accordingly, the control device 300 may sometimes be referred to as a controller, whether the control device 300 is a dedicated controller or a network device on which media playback system controller application software is installed.

Figure 4:
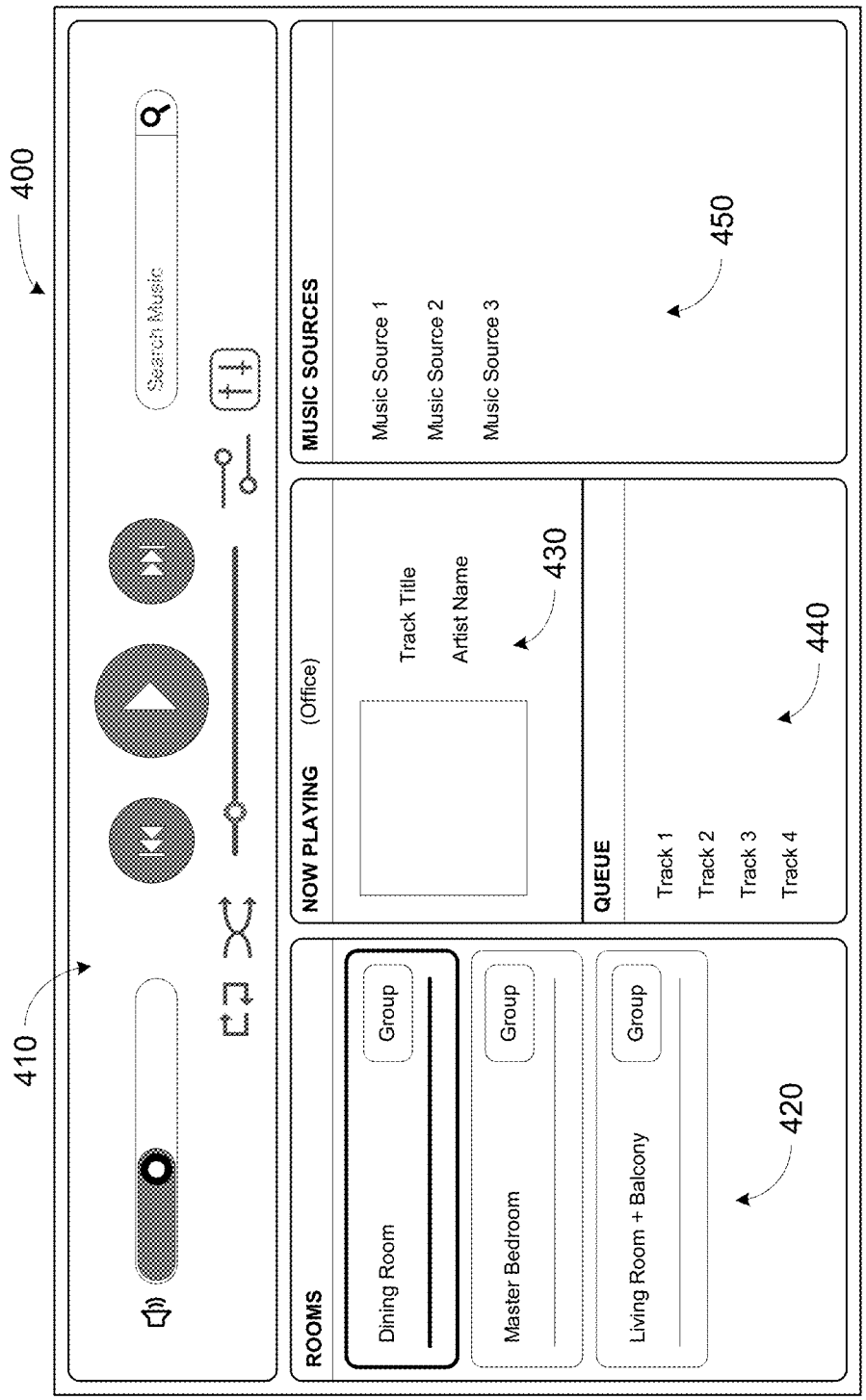
FIG. 4 shows an example controller interface.

The user interface 308 of the control device 300 may be configured to facilitate user access and control of the media playback system 100, by providing a controller interface such as the controller interface 400 shown in FIG. 4. The controller interface 400 includes a playback control region 410, a playback zone region 420, a playback status region 430, a playback queue region 440, and an audio content sources region 450. The user interface 400 as shown is just one example of a user interface that may be provided on a network device such as the control device 300 of FIG. 3 (and/or the control devices 126 and 128 of FIG. 1) and accessed by users to control a media playback system such as the media playback system 100. Other user interfaces of varying formats, styles, and interactive sequences may alternatively be implemented on one or more network devices to provide comparable control access to a media playback system.

The playback control region 410 may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 410 may also include selectable icons to modify equalization settings, and playback volume, among other possibilities.

The playback zone region 420 may include representations of playback zones within the media playback system 100. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 400 are also possible. The representations of playback zones in the playback zone region 420 may be dynamically updated as playback zone or zone group configurations are modified.

The playback status region 430 may include graphical representations of audio content that is presently being played, previously played, or scheduled to play next in the selected playback zone or zone group. The selected playback zone or zone group may be visually distinguished on the user interface, such as within the playback zone region 420 and/or the playback status region 430. The graphical representations may include track title, artist name, album name, album year, track length, and other relevant information that may be useful for the user to know when controlling the media playback system via the user interface 400.

The playback queue region 440 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

Referring back to the user interface 400 of FIG. 4, the graphical representations of audio content in the playback queue region 440 may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device.

The audio content sources region 450 may include graphical representations of selectable audio content sources from which audio content may be retrieved and played by the selected playback zone or zone group. Discussions pertaining to audio content sources may be found in the following section.

d. Example Audio Content Sources

As indicated previously, one or more playback devices in a zone or zone group may be configured to retrieve for playback audio content (e.g. according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100 of FIG. 1, local music libraries on one or more network devices (such as a control device, a network-enabled personal computer, or a networked-attached storage (NAS), for example), streaming audio services providing audio content via the Internet (e.g., the cloud), or audio sources connected to the media playback system via a line-in input connection on a playback device or network devise, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

The above discussions relating to playback devices, control devices, playback zone configurations, and media item sources provide only some examples of operating environments within which functions and methods described below may be implemented. Other operating environments and configurations of media playback systems, playback devices, and network devices not explicitly described herein may also be applicable and suitable for implementation of the functions and methods.

e. Example Cloud Computing Functions

Various references are made herein to "cloud computing." The term "cloud computing" is used to refer to services delivered using distributed computing over a network, such as the Internet. A non-exhaustive list of services delivered via the cloud include electronic mail (e.g., GMAIL® or HOTMAIL®), social networking (e.g., FACEBOOK®, LINKEDIN®, or TWITTER®), file hosting (e.g., DROPBOX®), and streaming audio (e.g., SPOTIFY®, PANDORA®, or BEATSAUDIO®). Other cloud services are certainly offered as well.

Cloud service providers may offer one or more interfaces for accessing their service over a network. For instance, some cloud services may be accessed by visiting a web site using a web browser. Other cloud services are accessed by executing a particular application specific to the cloud service on a computing device. Some cloud services may offer an application programming interface (API) to facilitate access to the service by a third-party web site or application. Cloud services may provide multiple techniques for accessing their service. In many cases, a user who has access to a given cloud service can access the service from any computing device that is connected to the network, provided that the computing device has a supported interface to the cloud service.

In one instance, accessing a cloud service may involve accessing, with a first computing device (i.e., a client), a second computing device or system (i.e., a server). Example client devices may include playback device 200 of FIG. 2, or control device 300 of FIG. 3, among other possible devices. One or more programs or applications (i.e., instructions) may execute on the server to perform computing operations supported by the cloud service. The client may send various commands to the server to instruct the server to perform the computing tasks supported by the cloud service.

Figure 5:
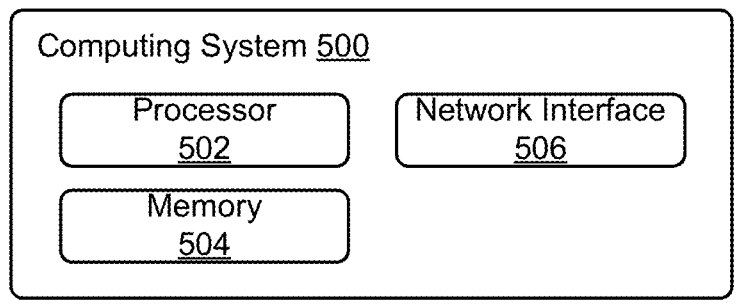
FIG. 5 shows an example computing system.

FIG. 5 illustrates an example computing system 500 that may provide a cloud service to one or more users. Example computing system 500 includes at least one processor 502, memory 504, and a network interface 506. The memory 504 may contain instructions executable by the processor 502 to perform computing tasks supported by a cloud service. The computing device 500 may communicate with other computing devices via the network interface 506.

In aggregate, the provision of a cloud service many involve multiple instances of computing system 500. Each instance of computing system 500 may provide the cloud service to one or more users. Cloud service providers may scale the number of instances of computing system 500 involved in providing the cloud service based on user demand.

In some embodiments contemplated herein, a cloud service provider may provide a neural network that has been trained to detect a set of known impairments or conditions. Such a cloud service provider may include one or more instances of a computing system, such as computing system 500, each of which may host an instance of the neural network (or a portion thereof). Client devices (e.g., playback devices and/or control devices) of a media playback system may provide input (e.g., input vector(s)) to the neural network, and receive an indication of which neurons of the neural network "fired" and thereby indicate the presence or absence of the known impairments or conditions.

III. Example Playback Device Calibration

As previously discussed, one or more playback devices, such as one or more of the playback devices 102-124 of FIG. 1, may be configured to provide a particular audio experience, and may be calibrated to provide that audio experience regardless of position(s) of the one or more playback devices within the playback environment. As noted above, example calibration procedures contemplated herein may involve a microphone of a recording device detecting and analyzing sound waves (e.g., one or more calibration sounds) emitted by the playback device(s) under calibration.

A calibration interface may be provided on a network device to guide a user through the calibration process. Example interfaces are described in U.S. non-provisional patent application Ser. No. 14/696,014, filed on Apr. 24, 2015, entitled "Speaker Calibration," which is incorporated herein in its entirety. Further example interfaces are described in U.S. non-provisional patent application Ser. No. 14/826,873, filed on Aug. 14, 2015, entitled "Speaker Calibration User Interface," which is also incorporated herein in its entirety. Alternatively, calibration may be performed automatically between the network device and the playback device(s), and may be conducted with or without interaction by a user of the network device. The network device may be a device the user can use to control the one or more playback devices. For instance, the network device may be similar to the control devices 126 and 128 of FIG. 1, and 300 of FIG. 3. The calibration interface may be a component of a controller interface, such as the controller interface 400 of FIG. 4 that is provided on the network device for controlling the one or more playback devices.

Once the one or more playback devices have been positioned within the playback environment, the calibration interface may cause the one or more playback devices to play a calibration tone. Particular calibration tones may facilitate example calibration procedures contemplated here. Example calibration tones are described in U.S. non-provisional patent application Ser. No. 14/805,140, filed on Jul. 21, 2015, entitled "Hybrid Test Tone for Space-Averaged Room Audio Calibration Using A Moving Microphone," which is incorporated herein in its entirety.

The network device may be positioned so as to receive the audio data related to the playback of the calibration tone by the one or more playback devices. In one example, the interface may prompt the user to move the network device within the playback environment while the calibration tone is playing. For example, in one more specific case, the interface may instruct the user to traverse areas within the playback environment where enjoyment of audio playback by the one or more playback devices may typically occurs. In another example, the interface may instruct the user to move the network device as close as possible to opposing border regions of the playback environment, such as walls in a room. In one case, the calibration interface may provide a video demonstrating how a user may traverse a playback environment. The video may be shown to the user via the interface before the calibration tone is played or while the calibration tone is playing. Examples of a moving microphone during calibration are described in U.S. non-provisional patent application Ser. No. 14/481,511, filed on Sep. 9, 2014, entitled "Playback Device Calibration," which is incorporated herein in its entirety.

In some examples, multiple playback devices may be calibrated concurrently. Further, some playback devices may include multiple playback channels (e.g., a tweeter and a woofer, or multiple speakers configured to act as a channel), which may be calibrated concurrently. Example techniques to facilitate calibration of multiple playback channels are described in U.S. non-provisional patent application Ser. No. 14/805,340, filed on Jul. 21, 2015, entitled "Concurrent Multi-Loudspeaker Calibration with a Single Measurement," which is incorporated herein in its entirety.

In one example, the calibration tone may be played for a predetermined duration of time, and the user may be allocated the predetermined duration of time to traverse the areas in the playback environment. In another example, the amount of time that the calibration tone is played back may be modified based on information sensed by the network device regarding the motion or path of the network device. For instance, if the network device determines that that the network device has started to backtrack across a previously traversed path, the network device may determine that no additional measurement of the calibration tone is necessary and may cause playback of the calibration tone by the one or more playback devices to be terminated.

In a further example, the amount of time that the calibration tone is played back may be modified based on the detected audio signal. For instance, if the network device determines that additional samples of the audio signal detected in the playback environment will not improve the determination of the characterization of the playback environment, the network device may determine that no additional measurement of calibration tone is necessary and may cause playback of the calibration tone by the one or more playback devices to be terminated. Other examples are also possible.

The predetermined duration of time may vary depending on a type and/or size of the playback environment. For instance, prior to causing the one or more playback device to play the calibration tone, the calibration interface may prompt the user to indicate a type and/or a size of the playback environment. Based on the user's input, the interface may identify an appropriate predetermined duration of time to play the calibration tone based on the indicated type and/or size of the playback environment. In one case, the provided demonstration video may also vary based on the indicated type and/or size of the playback environment. In another example, the user may be instructed to move between opposing border areas of the playback environment. The approximate size of the playback environment may be determined based on a detected motion and/or path of the network device, so that the playback time of the calibration tone may be adjusted (extended or shortened) based on the detected motion and/or detected path of motion of the user. For example, if it is detected that the user is still moving the network device, the calibration tone playback may be extended. In another example, if it is detected that the user is moving the device in a direction that indicates that the playback environment is larger than previously assumed and that the user needs more time to properly move the device to cover the entire or a substantial portion of the playback environment, the playback time may be extended.

While the one or more playback devices is playing the calibration tone, a microphone of the network device, such as microphone 310 of the control device 300, may detect an audio signal. A processor of the network device, such as the processor 302 of the control device 300, may receive a stream of audio data from the microphone as the audio signal is detected. The processor may then process the received audio data to determine audio characteristics of the playback environment. For instance, a linear frequency response associated with the playback environment may be determined based on the audio data.

A signal processing algorithm may then be determined based on the audio characteristics. For instance, equalization parameters may be determined such that when the equalization parameters are applied by the one or more playback device when playing audio content, a particular audio experience may be created. In other words, a calibration profile may be applied to a playback device to offset acoustic characteristics of the environment.

IV. Example Techniques to Train a Neural Network to Detect Impairments

Some example embodiments described here may facilitate training a neural network to detect specific impairments or other conditions when provided input data (e.g., sensor data) characteristic of one or more of the impairments.

Figure 6:
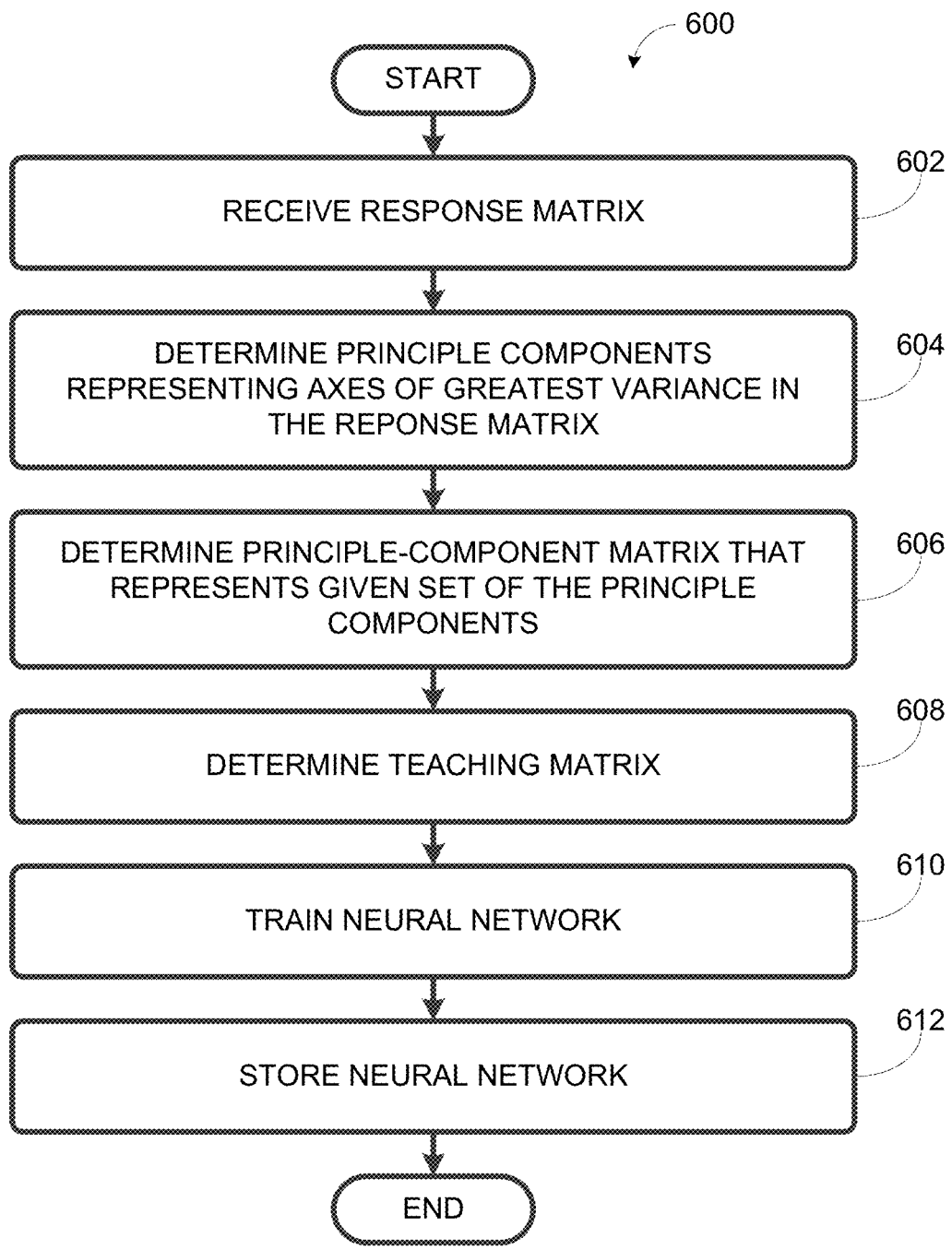
FIG. 6 shows a flow diagram of an example technique to train a neural network to detect known impairments or conditions.

FIG. 6 shows a flow diagram of example implementation 600 for training a neural network. Implementation 600 presents example techniques that can be implemented within an operating environment involving, for example, the media playback system 100 of FIG. 1, one or more of the playback device 200 of FIG. 2, and/or one or more of the control device 300. In one example, the implementation 600 may be performed in whole or in part by a computing system in communication with a media playback system. For instance, the implementation 500 may be performed by one or more of computing system 500 of FIG. 5. In such cases, one or more of the computing system 500 may have installed thereon a software application that includes instructions executable by one or more processors of a respective computing system to cause the respective device(s) or system to perform the functions of implementation 600.

Implementation 600 may include one or more operations, functions, or actions as illustrated by one or more of blocks 602-612. Although the respective blocks are illustrated in sequential order, these blocks may also be performed in parallel, and/or in a different order than those described herein. Also, the various blocks may be combined into fewer blocks, divided into additional blocks, and/or removed based upon the desired implementation. In addition, for the implementation 500 and other processes and methods disclosed herein, the flowcharts show functionality and operation of only a few possible implementations of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive.

The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the implementation 500 and other processes and methods disclosed herein, each block may represent circuitry that is wired to perform the specific logical functions in the process.

a. Receive Response Matrix

At block 602, implementation 600 involves receiving a response matrix. For instance, a computing system, such as computing system 500, may receive a plurality of responses, which may be combined into a response matrix. Generating such responses may involve a playback device recording audio emitted by a playback device with and without a set of known impairments applied. Each response may be a respective vector that includes components which represent the response of the system in respective frequency ranges. In some cases, the responses of such a system may be represented as power spectral densities. For instance, an example response vector may include up to 8000 or more components, each component representing power density of the recorded audio within a respective range of frequencies.

The vectors representing the respective responses may be combined into the response matrix. Such a response matrix may include a dimension for each response. For example, 150 vectors representing respective power spectral densities may be generated and combined into a response matrix P of dimension n×m (e.g., 150×8000). A portion of these responses may represent responses of a playback device with respective impairments present, while the remainder of responses may represent responses of a playback device without the respective impairments present.

As noted above, example known impairments that an example neural network might be trained to detect may include, but are not limited to an object(s) or obstruction(s) at least partially covering or otherwise obstructing or affecting sound detected by one or more microphones of a recording device that is being used to record audio in connection with a calibration procedure. Such objects and/or obstructions may include, for example, (i) a user's finger at least partially covering (typically inadvertently) one or more microphones that are being to detect, monitor, and/or record sound as part of the calibration procedure, (ii) a smartphone case at least partially covering or enclosing one or more smartphone microphones that are being used to detect, monitor, and/or record sound as part of the calibration procedure, (iii) lint, dust, or other debris on or in one or more microphones being used to detect, monitor, and/or record sound in connection with the calibration procedure, (iv) objects that are on a table, shelf, or wall near the device comprising one or more of the microphones that are being used to detect, monitor, and/or record sound in connection with the calibration procedure, and/or (v) other object(s) and/or (vi) other object(s) and/or obstruction(s) that tend to affect sound waves received by the one or more microphones being used to detect, monitor, and/or record sound in connection with the calibration procedure.

To generate responses representing such impairments, audio can be recorded (i) using different playback devices, (ii) in different rooms, (iii) with different variants of each impairment (e.g. with different type of cases on a smartphone, different amounts/types of debris on the microphone), (iv) with playback devices placed in different locations within a room, (v) with playback devices arranged in different orientations (up, down, side, etc.), (vi) with multiple playback devices arranged in different positions relative to one another within a room, (vii) using different audio test signals, and/or (viii) using time-varying conditions, such as audio test signals that change over time, a user moving his/her finger in front of and then away from the microphone, or other time-varying conditions. In some cases, to reduce variance across the set of responses, certain conditions may be held constant across the set of responses. For instance, the same type of recording device (with the same type of microphone), the same type of playback device, and/or the same audio test tone might be used for all of the responses.

As mentioned earlier, each individual response is represented as a vector in the matrix. Some embodiments may include multiple vectors for a particular impairment, where each vector of the multiple vectors for the impairment corresponds to a different variant of the impairment. In some embodiments, the matrix may also include vectors for different variants without impairments.

In some embodiments, the responses (e.g., the power spectral density (PSD) measurements) defined by the vectors in the matrix may correspond to a full range of the PSD measurement. For example, the response to test audio from approximately 20 Hz to approximately 22 kHz, which may correspond to a range of frequencies that playback devices under calibration are capable of emitting or a range that the playback devices are to be calibrated over. In other embodiments, PSD measurements defined by the vectors in the matrix may be windowed or trimmed so as to represent a specific portion of the frequency or amplitude range of a particular response. Some embodiments may include performing this windowing or trimming of the PSD measurement. In some embodiments, the PSD measurement may be windowed or trimmed to include the response between about 2.5 kHz to 16 kHz, which may represent frequencies over which the known impairments cause most variance. However, other ranges or portions of the full PSD measurement could be used as well.

Some embodiments may further include converting individual PSD measurements from linear spacing to log-spacing in the frequency domain, which may improve computational efficiency by reducing the number of frequency bins (i.e., components) in each vector of the response matrix. However, such conversion might not be required in all embodiments.

b. Determine Principle Components Representing Axes of Greatest Variance in the Response Matrix At block 604, the implementation 600 involves determining principle components from the response matrix. For instance, after recording the audio with and without each impairment (and with the different variants of each impairment and non-impairment case, for embodiments that include different variants of each impairment and non-impairment condition) and building the matrix of vectors corresponding to the different variants of impairment and non-impairment conditions, a computing system may extract principal components from the matrix.

The principal components are eigenvectors representing the axes of greatest variance in the matrix data using the fewest possible vectors. In two-dimensional space, the principal components can be characterized as a linear direction and magnitude that explains some large percentage of a two-dimensional dataset. As noted above, an example response matrix may include a dimension for each response (vector). In some embodiments, the matrix is a 125 to 175 dimension matrix (e.g., 150 dimensions). By extracting principle components from this matrix, the dimensionality of the data set can be reduced.

Extracting the principle components from the response matrix involves identifying a new set of orthogonal coordinate axes through the response matrix. This involves finding the direction of maximal variance through the dataset in the multi-dimensional space (e.g., the 150-dimension response matrix). It is equivalent to obtaining the (least-squares) line of best fit through plotted data representing the response matrix. The axis of maximal variance is the first principal component of the data. After obtaining the direction of maximal variance through the response matrix dataset, additional principle components of the data are determined. Each subsequent principle component (i.e., the second, third, fourth, and fifth principle components) is orthogonal to the previous principle component (e.g., the second principle component is orthogonal to the first principle component).

To illustrate, consider the example response matrix noted above, which is an m×n matrix, X where the n columns are the components of the response vectors and the m rows are the responses (e.g., a 150 response by 8000 sample response matrix, X). To extract principle components, this matrix X is linearly transformed into another matrix Y, so that for some m×m matrix, P, Y=PX. In other words, X is being projected onto the columns of P. Thus, the rows of P are a new basis for representing the columns of X (i.e., the principle component directions).

To linearly transform the original response matrix X using the relation Y=PX for some matrix P, the processing device determines a diagonal covariance matrix $C_Y$ for Y.

$$C_Y = \frac{1}{n-1}YY^T = \frac{1}{n-1}(PX)(PX)^T = \frac{1}{n-1}(PX)(X^TP^T) = \frac{1}{n-1}P(XX^T)P^T$$

$$C_Y = \frac{1}{n-1}PSP^T \text{ where } S = XX^T$$

S is an m×m symmetric matrix, since $(XX^T)^T$ $(XT)^T$ $(X)^T = XX^T$. Since every square symmetric matrix is orthogonally diagonalizable, $S = EDE^T$, where E is an m×m orthonormal matrix which the orthonormal eigenvectors of S as its columns and D is a diagonal matrix that has the eigenvalues of S as its diagonal entries. In the transformation matrix, P, the rows of P are the eigenvectors of S. Substituting this into the diagonal covariance matrix $C_Y$ for Y yields $$C_Y = \frac{1}{n-1} PSP^T = \frac{1}{n-1} E^T EDE^T E.$$

Since E is an orthonormal matrix, $E^T E = I$, where I is the m×m identity matrix. Then for P where the rows of P are the eigenvectors of S, $$C_Y = \frac{1}{n-1} D.$$

c. Determine a Principle-Component Matrix that Represents a Given Set of the Principle Components At block 606, the implementation 600 involves determining a principle-component matrix that represents a given set of the principle components. For instance, after extracting the principal components from the matrix, the principal components may be considered in order of decreasing error, and some number of the most accurate principle components (i.e., the principal components having the least error) are selected for inclusion in a smaller matrix.

For example, in an embodiment with a few hundred vectors (i.e., one vector for each response, where each response is a PSD measurement of a particular variant as described above) in the matrix, some embodiments may select the top 6-12 (or some other number) most accurate principal components (i.e. the principle components that represent the axes of greatest variance). In one example having a 150 dimensional matrix, the top eight most accurate principal components may be selected and placed into an 8×150 matrix (i.e., 8 principal components×150 responses), which represents a new simplified space that characterizes a multidimensional variance of the teaching dataset.

To obtain the relative amount of variance represented by each principle, referring back to the above example, the processing device may determine the eigenvalues and eigenvectors of $S = XX^T$. These eigenvalues can be sorted in descending order and placed on the diagonal of D. The orthonormal matrix E is constructed by placing the associated eigenvectors in the same order to form the columns of E (i.e. place the eigenvector that corresponds to the largest eigenvalue in the first column, the eigenvector corresponding to the second largest eigenvalue in the second column and so on). In this way, the principal components (the rows of P) are the eigenvectors of the covariance matrix $XX^T$ and each row is ordered based on how much of the variance of X is represented by that principal component.

A subset that represents the axes of greatest variance may be selected from the principle components. As noted above, in one example having a 150 dimension matrix, the first eight principal components may be selected and placed into an 8×150 matrix (i.e., 8 principal components×150 responses), which represents a new simplified space that characterizes a multidimensional variance of the teaching dataset.

In some embodiments, the computing system may store the magnitude of each principal component vector that represents the variance in a single dimension across all the frequency bins, and, at least in some embodiments, use the magnitudes of the principal component vectors for subsequent determinations.

d. Determine Teaching Matrix

At block 608, the implementation 600 involves determining a teaching matrix. For instance, the computing system may determine a teaching matrix that represents the response matrix in a simplified space (i.e., a matrix with fewer dimensions). To illustrate, continuing with the 8×150 matrix example above, the matrix of PSDs (150×8000) may be projected onto the primary component matrix (via matrix multiplication to generate a representation of each PSD (i.e., each impairment and non-impairment condition)) in a simplified PC space. The PC space is a teaching matrix representing the matrix of PSDs using the primary components, which reduces the dimensionality of the response matrix.

e. Train Neural Network

At block 610, the implementation 600 involves training a neural network. For instance, a computing system may train a neural network to detect the set of known impairments. An example neural network may include a plurality of neurons. Two or more of the neurons may correspond to respective known impairments. Once trained, an input that is characteristic of a particular impairment will cause the neuron that corresponds to that impairment to "fire," thereby indicating the presence of the impairment in the system from which the input was captured.

Figure 7:
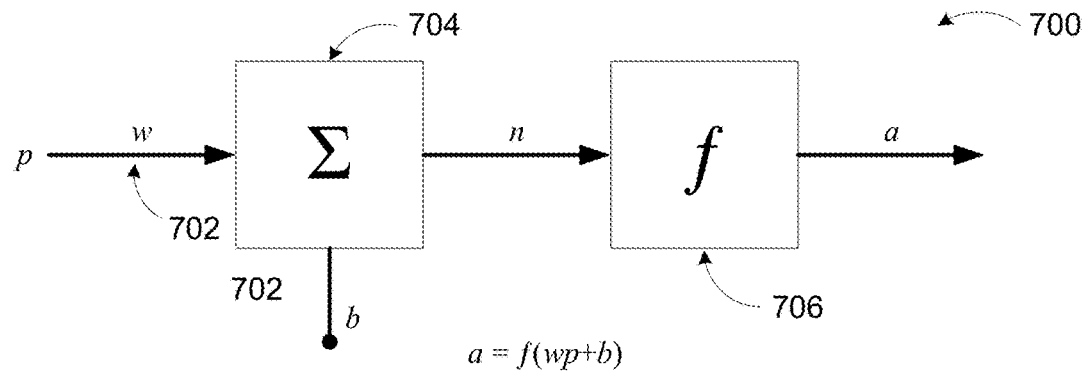
FIG. 7 shows an illustrative neuron of a neural network.

FIG. 7 illustrates an example neuron 700 of a neural network. Neuron 700 includes a series of functional operations. Upon being provided a scalar input p, at 702 neuron 700 multiplies p by a scalar weight w to form the product wp. At 704, the weighted input wp is added to the scalar bias b to form the net input n. At 706, the net input n is passed through the transfer function $f$, which produces the scalar output a. In operation, a given input p that produces a certain scalar output a (e.g., an output that exceeds a threshold) can be considered to have caused the neuron 700 to "fire."

Figure 8:
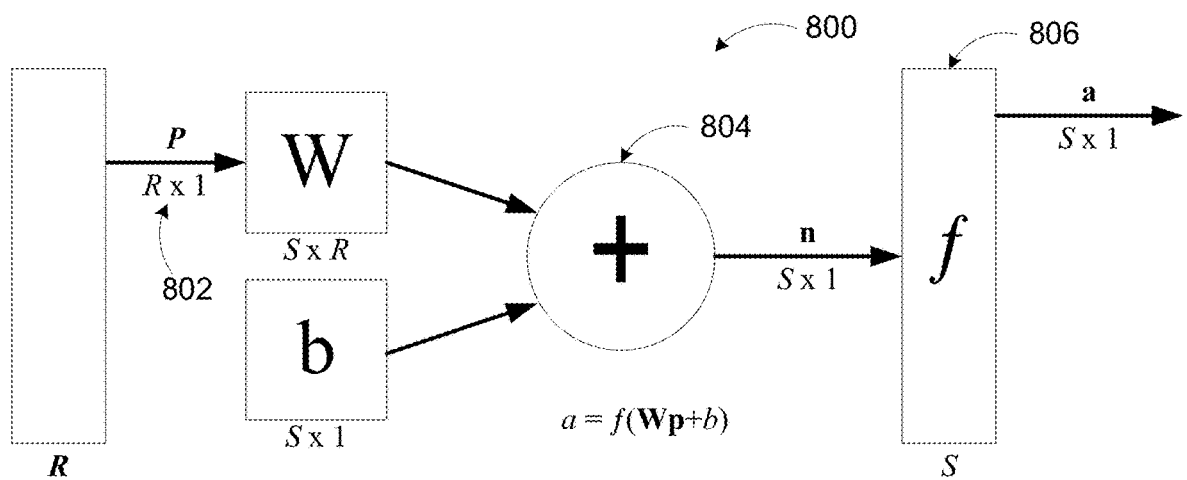
FIG. 8 shows another illustrative neuron of a neural network.

FIG. 8 illustrates another example neuron 800 of a neural network. In contrast to neuron 700, neuron 800 is configured to handle inputs that are vectors (e.g., input vectors representative of responses, or PSDs of a media playback device or system). In FIG. 8, the input to neuron 800 is a vector p of size R. Upon being provided a vector input p, at 802 neuron 800 multiplies p by a matrix weight W to form the product Wp. At 804, the weighted input Wp is added to the scalar bias b to form the net input n. At 806, the net input n is passed through the transfer function $f$, which produces the scalar output a. Like with neuron 700, a given input p that produces a certain scalar output a (e.g., an output that exceeds a threshold) can be considered to have caused the neuron 800 to "fire."

As noted above, example neural networks include a plurality of neurons (e.g., a plurality of neuron 800). In some embodiments, a neural network includes a first neuron that corresponds to a lack of impairment, which may be considered a condition to detect in and of itself. When that neuron fires, the neural network indicates that no impairment is present in the input. The example neural network may also include a plurality of second neurons that correspond to respective impairments. When a particular second neuron fires, the neural network indicates that the impairment or condition corresponding to that particular neuron is present.

Figure 9:
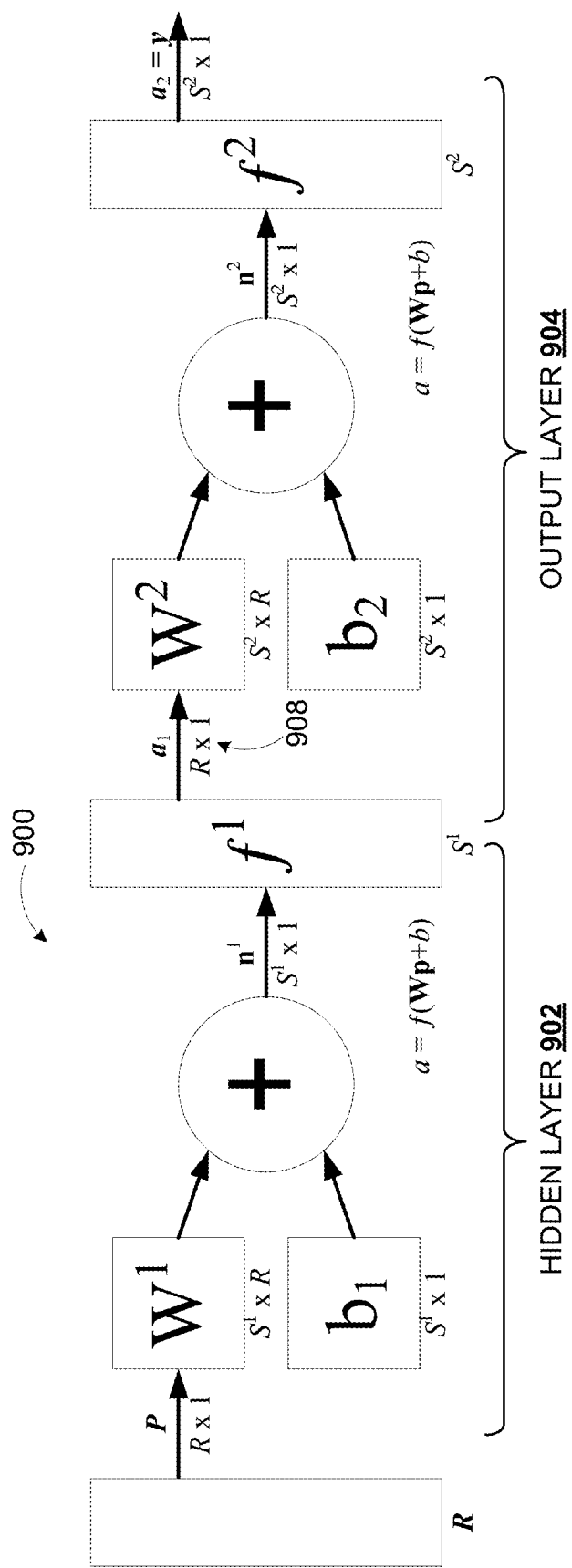
FIG. 9 shows an example neural network.

The neural network may include two or more layers, each including a weight matrix W, bias vector b and output vector a. FIG. 9 depicts an example two-layer neural network 900 that includes a hidden layer 902 and an output layer 904. Each of the layers may include a plurality of neurons (e.g., a neuron corresponding to each impairment or condition to detect). The layers of a neural network afford different functions. The output layer 904 produces of the output of the neural network. All other layers are referred to as hidden layers (as their output is internal to the neural network). In some examples, the hidden layer 902 is used for training the neural network.

Training the neural network involves tuning the weight W, bias vector b and transfer function $f$ to cause a neuron to fire when input that is characteristic of a given impairment is provided as input to that neuron. In some examples, the teaching matrix is provided in a loop as input to the neural network. The output of each loop iteration is compared to a target matrix that represents an ideal determination of each known impairment or condition. This output and the error (e.g., the-mean square error) of the output as compared with the target matrix is used to iteratively train the network using backpropagation (e.g., Levenberg-Marquardt backpropagation). Under backpropagation, the output of each loop iteration and the error of the output as compared with the target matrix is used to adjust the weight W, bias vector b and transfer function $f$ to iteratively tune the neural network to produce the desired output (i.e., detection of an impairment), given an input that is characteristic of that impairment. The loop is repeated until a time limit is reached, a threshold number of iterations are performed, or a convergence threshold is met.

In some cases, characteristic responses of devices used in generating the response matrix may affect the training of the matrix. As noted above, in generating a response matrix, a sound (e.g., a test tone) is emitted by playback device and recorded by a recording device, both with and without a set of impairments present. However, the particular playback device and recording device used to generate the responses may have characteristic responses. For instance, a particular playback device (or a certain type of playback device (e.g., a particular model)) might not have a perfectly flat response and might boost some frequencies while cutting others. As another example, a microphone of a recording device (e.g., an IPHONE® 6) might detect certain frequencies as being relatively more or less energy dense than they actually are. These characteristic responses may affect training of the neural network, as the response matrix may be skewed by these characteristic responses.

To offset such characteristic responses, the computing system may compensate for the characteristic responses by training the neural network with a response matrix that has the characteristic responses of the devices removed. To remove the characteristic responses from the response measurements, the computing system may multiply (e.g., take the dot product) of each response by the inverse of the characteristic response of each device used, thereby yielding a response dataset that is not influenced by the characteristic responses of the devices used to generate the response matrix.

f. Store Neural Network

At block 612, the implementation 600 involves storing the neural network. For instance, the trained neural network is stored on one more instances of computing system 500, which are providing a cloud service to media playback systems (e.g., media playback system 100). Then, when a given media playback system performs a calibration on one or more playback devices, that media playback can provide response(s) of the one or more playback devices to a given instance of computing system 500. Computing system 500 can provide the response(s) to the neural network to detect any impairments that might be affecting the given media playback system and thereafter notify that media playback system of any such impairments. Further, the response(s) from the given media playback system may be used to further tune the neural network, using the backpropagation techniques described above.

Alternatively, one or more devices of a media playback system may store the trained neural network for use in detecting impairments or other conditions. Such devices might include one or more playback devices (e.g., one or more of playback device 200) and/or one or more control devices (e.g., one or more of control device 300). From time to time, an updated version of the neural network may be distributed to the media playback systems, perhaps from one more instances of computing system 500 via a network (e.g., from a cloud service).

V. Example Techniques to Detect Impairments Using a Neural Network

As noted above, example embodiments described herein may involve using a neural network to detect impairments.

Figure 10:
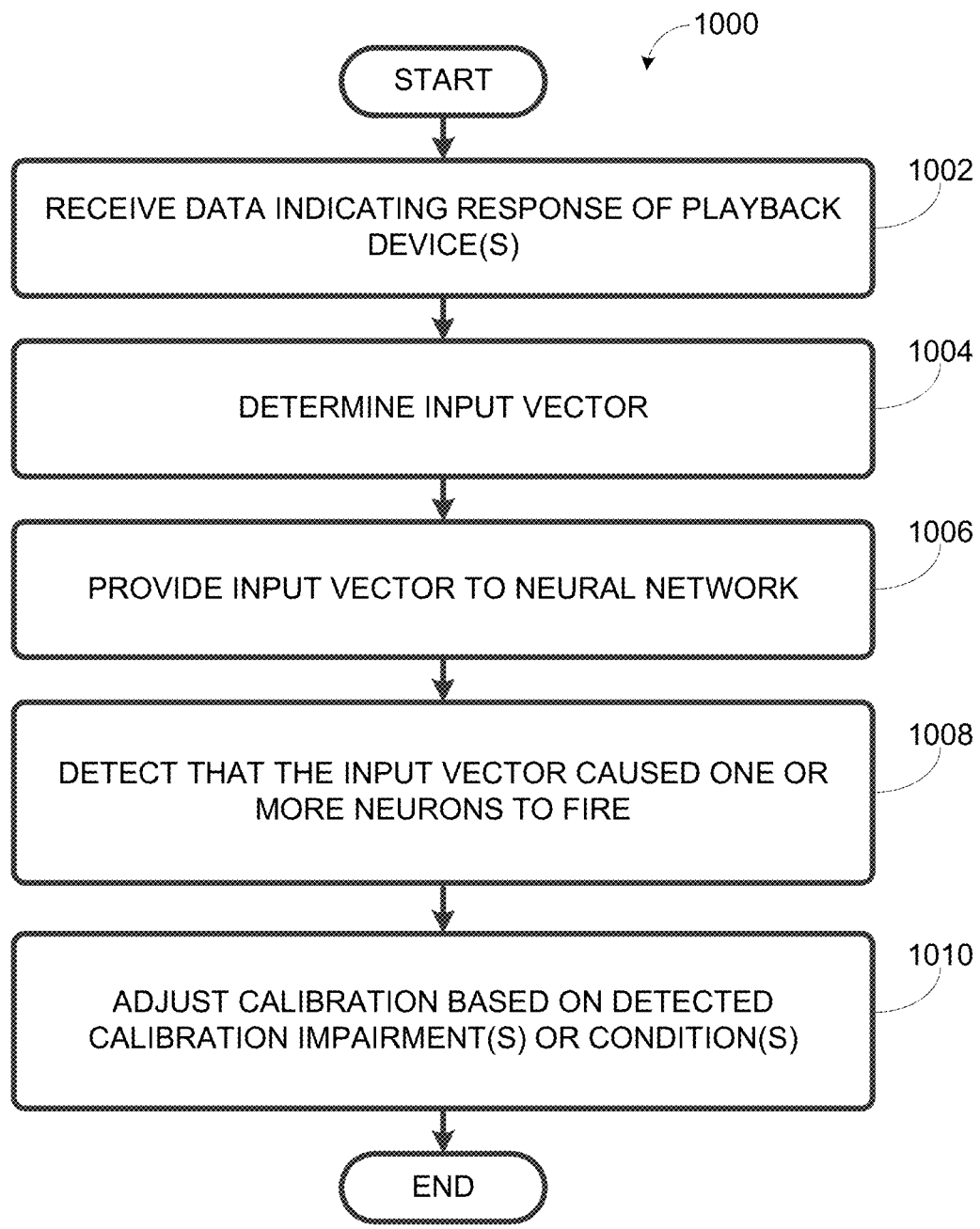
FIG. 10 shows a flow diagram of an example technique to detect known impairments or conditions using a neural network.

FIG. 10 shows a flow diagram of example implementation 1000 to detect impairments or other conditions. Implementation 1000 presents example techniques that can be implemented within an operating environment involving, for example, the media playback system 100 of FIG. 1, one or more of the playback device 200 of FIG. 2, and one or more of the control device 300. In one example, the implementation 1000 may be performed in whole or in part by a computing device in communication with a media playback system. For instance, the implementation 800 may be performed by one or more of the control devices 126 and 128 of FIG. 1. In such cases, one or more of the control devices 126 and 128 may have installed thereon a software application that includes instructions executable by a processor of a respective control device to cause the respective control device to perform the functions of implementation 800.

Implementation 1000 may include one or more operations, functions, or actions as illustrated by one or more of blocks 1002-1010. Although the respective blocks are illustrated in sequential order, these blocks may also be performed in parallel, and/or in a different order than those described herein. Also, the various blocks may be combined into fewer blocks, divided into additional blocks, and/or removed based upon the desired implementation. In addition, for the implementation 1000 and other processes and methods disclosed herein, the flowcharts show functionality and operation of only a few possible implementations of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive.

The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the implementation 1000 and other processes and methods disclosed herein, each block may represent circuitry that is wired to perform the specific logical functions in the process.

a. Receive Data Indicating a Response of One or More Playback Devices

At block 1002, implementation 1000 involves a media playback system receiving data indicating a response of one or more playback devices. For instance, referring to media playback system 100 of FIG. 1, control device 128 may detect, via a microphone, audio emitted by playback device 120, yielding a measurement indicative of a response of playback device 120. Based on such recorded audio, control device 128 may determine a response (e.g., a power spectral density or frequency response) of playback device 120 as captured by control device 128 in the bedroom listening area. This response may be represented as a vector (i.e., a response vector) containing a number of components, each representing response at a respective frequency (or frequency range).

In some embodiments, a recording device (e.g., control device 126 or 128) may capture audio from one or more playback devices during a calibration procedure. As noted above, some calibration procedures contemplated herein involve a recording device (e.g., a control device) of the media playback system detecting and analyzing sound waves (e.g., one or more calibration sounds) which were emitted by one or more playback devices of the media playback system. From such detected sound waves, the recording device (or another device of the media playback system) may determine a response of the one or more playback devices.

In some embodiments, the control device may analyze the calibration sound over a range of frequencies over which the playback device is to be calibrated (i.e., a calibration range). Accordingly, the particular calibration sound that is emitted by a playback device may cover the calibration frequency range by including sound at frequencies within that range. The calibration frequency range may include a range of frequencies that the playback device is capable of emitting (e.g., 15-30,000 Hz) and may be inclusive of frequencies that are considered to be in the range of human hearing (e.g., 20-22,000 Hz). By emitting and subsequently detecting a calibration sound covering such a range of frequencies, a response that is inclusive of that range may be determined for the playback device. Such a frequency response may be representative of the environment in which the playback device emitted the calibration sound (and perhaps also representative of a known impairment or other condition that is present).

In some embodiments, the media playback system may determine a response (e.g., a PSD measurement) that corresponds to a full range of the PSD measurement. For instance, such a response may correspond to a range of frequencies that playback devices under calibration are capable of emitting (e.g., from 15-30,000 Hz) or possibly a range that the playback devices are to be calibrated over (e.g., 20-22,000 Hz). In other embodiments, the response measurement may be windowed or trimmed so as to represent a specific portion of the frequency or amplitude range of a particular response. Some embodiments may include performing this windowing or trimming of the response measurement. Within examples, the response measurement may be windowed or trimmed to include the response between about 2.5 kHz to 16 kHz, which may represent frequencies over which the known impairments are understood to cause most variance. However, other ranges or portions of the full response measurement could be used as well.

Some example calibration procedures may involve detecting the calibration sound at multiple physical locations within the environment, which may assist in capturing acoustic variability within the environment. To facilitate detecting the calibration sound at multiple points within an environment, some calibration procedures involve a moving microphone. For example, the microphone that is detecting the calibration sound may be continuously moved through the environment while the calibration sound is emitted.

In some embodiments, a playback device may repeatedly emit the calibration sound during the calibration procedure such that the calibration sound covers the calibration frequency range during each repetition. With a moving microphone, repetitions of the calibration sound are continuously detected at different physical locations within the environment. For instance, the playback device might emit a periodic calibration sound. Each period of the calibration sound may be detected by the control device at a different physical location within the environment thereby providing a sample at that location. Such a calibration sound may therefore facilitate a space-averaged calibration of the environment.

In some cases, the response of the one or more playback devices may be averaged over time and/or space. For instance, the media playback system may determine respective responses from two or more of the repetitions of the calibration sound and average these responses to determine a time-averaged response. Further, given a moving microphone, such responses may be further averaged across the listening area. A time- and/or space-averaged response may provide a better representation of the listening area as a whole. Further, such averaging may filter out temporary conditions, such that the response indicates impairments affect the calibration as a whole.

In some circumstances, multiple playback devices may be calibrated during a calibration procedure. For instance, an example calibration procedure may calibrate a grouping of playback devices. Such a grouping might be a zone of a media playback system that includes multiple playback devices, or, perhaps a grouping might be formed from multiple zones of a media playback system that are grouped into a zone group that includes a respective playback device from each zone. Such groupings might be physically located within the same environment (e.g., a room of a house or other building). In such cases, the control device may capture respective calibration sounds from each of the playback devices, or a response indicating the group as a whole.

b. Determine Input Vector

At block 1004, the implementation 1000 involves determining an input vector. For instance, a media playback system, such as media playback system 100 of FIG. 1, may determine an input vector representing the response of the one or more playback devices. This input vector may be ultimately provided to a neural network.

Determining the input vector may involve projecting a response vector onto a principle component matrix representing variance caused by the known impairments or conditions. As noted above, the response of the one or more playback devices may be represented as a response vector. As described above in connection with block 606 of FIG. 6, the principle-component matrix represent a given set of the principle components of a response matrix generated in the process of training the neural network. After training the network, this principle component matrix may be stored on one or more instances of a computing system and/or distributed to media playback systems.

Some embodiments may further include converting the input vector or the response measurements from linear spacing to log-spacing in the frequency domain, which may improve computational efficiency by reducing the number of frequency bins (i.e., components) in the input matrix. However, such conversion might not be required in all embodiments.

In some cases, characteristic responses of devices used in training the neural network may affect detecting impairments. To offset such characteristic responses, the media playback system may compensate for the characteristic responses by removing the characteristic responses from the input vector or the response vector. To remove the characteristic responses from the response measurements, the media playback system may determine the difference in the frequency response of the devices used in calibration relative to the device used in training the matrix. The media playback system may then multiply (e.g., take the dot product) of this difference and the response vector, thereby yielding a response vector that is not influenced by the characteristic responses of the devices used to train the neural network.

c. Provide Input Vector to Neural Network

In FIG. 10, at block 1006, implementation 1000 involves providing the input vector to a neural network. As noted above, some neural networks (e.g., any of the neural networks discussed above in connection with implementation 600, such as neural network 900) may be configured to accept a vector as input (e.g., a vector p).

Within examples, the media playback system may provide the input vector to a locally or remotely hosted neural network. For instance, the media playback system may send the determined input vector to a computing system (e.g., an instance of computing system 500) along with a request to provide the input vector to a particular neural network that has been trained to detect a set of known impairments or conditions that might affect calibration and/or operation of the media playback system (e.g., any of the neural networks discussed above in connection with implementation 600, such as neural network 900). Alternatively, an instance of the neural network may be stored locally on a device of the media playback system and the media playback system may provide the determined input vector to that device.

d. Detect that the Input Vector Caused One or More Neurons to Fire

Returning to FIG. 10, at block 1008, the implementation 1000 involves detecting that the input vector caused one or more neurons of the neural network to fire. For instance, one or more particular output neurons of the neural network may output respective values corresponding to "firing." As noted above, a neuron may be considered to have "fired" when the output of its transfer function exceeds a firing threshold. For instance, a neural network may have a transfer function that outputs values between 0 and 1. Values about a certain level (e.g., 0.5 or 0.9) may be considered to have "fired" the neuron.

As described above in connection with block 610 of FIG. 6, in some examples, the neural network includes at least one first neuron corresponding to an absence of calibration impairment and one or more second neurons corresponding to respective calibration impairments. In such cases, detecting that the input matrix caused one or more neurons of the neural network to fire may involve determining that the determined input vector did not cause the at least one first neuron to fire and determining that the input vector caused at least one of the one or more second neurons to fire. For instance, after determining that input vector did not cause the at least one first neuron to fire such that the neural network did not indicate a lack of impairments, the respective outputs of the one or more second neurons may be considered to determine whether any of the second neurons fired. A second neuron firing may indicate the presence of a particular impairment or condition corresponding to that neuron, as that second neuron was trained to detect that particular impairment or condition.

Certain known impairments that a neural network may be trained to detect may include a case over the recording device (e.g., a protective case over a smartphone). Such cases may cover or otherwise affect the operation of a microphone. Certain types of cases may impair the microphone in predictable ways (e.g., by consistently cutting and/or boosting certain frequencies). For instance, OTTERBOX® and/or LIFEPROOF® cases may provide a level of water resistance to the microphone of a device by covering its microphone with flap made of rubber or some other material. A flap of a particular type of case may impair detection of audio by the neural network in a predictable way that can be offset. As such, in some embodiments, one or more neurons may correspond to particular types of recording-device cases. In such embodiments, detecting that the input vector caused one or more neurons of the neural network to fire may involve detecting that the input vector caused a neuron corresponding to a particular type of recording-device case to fire.

Neurons may correspond to any of the example known conditions or impairments described herein, as well as other conditions that might affect operation of a media playback system. For instance, in some cases one or more neurons may correspond to different types of rooms (e.g., kitchen, bathroom, bedroom, office) which may have characteristic responses based on the furnishings and finishes typically found in such room types. As such, detecting that the input vector caused one or more neurons of the neural network to fire may involve detecting that the input vector caused a neuron corresponding to a particular type of room to fire. While certain embodiments have been described herein, such embodiments are not intended to be limiting, but rather exemplary of possible conditions or impairments that could be detected by disclosed techniques.

e. Adjust Calibration Based on Detected Calibration Impairments or Conditions

In FIG. 10, at block 1010, implementation 1000 involves adjusting a calibration of the one or more playback devices to offset the one or more particular calibration impairments. For example, as noted above, after detecting an impairment, some embodiments may further include one or more of (a) indicating to a user visually (via a control device or playback device), or audibly (via controller or audio playback device), that an impairment has been detected by visual or other means and/or (b) correcting the calibration to offset the detected impairment. If no impairment is detected (e.g., an neuron corresponding to a lack of impairment fires or no neurons that correspond to known impairments fire), the media playback system may receive an indication of this status and proceed with calibration and/or operation.

In some embodiments, the action taken may vary depending on the type of impairment detected. For example, for impairments that can be corrected, the techniques disclosed herein may correct or compensate for the impairment. For other impairments (e.g., impairments that cannot be readily offset), a control device or playback device may provide a notification (via a visible, audible, physical (e.g., vibration), or other notification) of the detected (or suspected) impairment so that the user can take action to correct or remove the impairment. The notification may also include instructions or suggestions for correcting the detected (or suspected) impairment.

Figure 11:
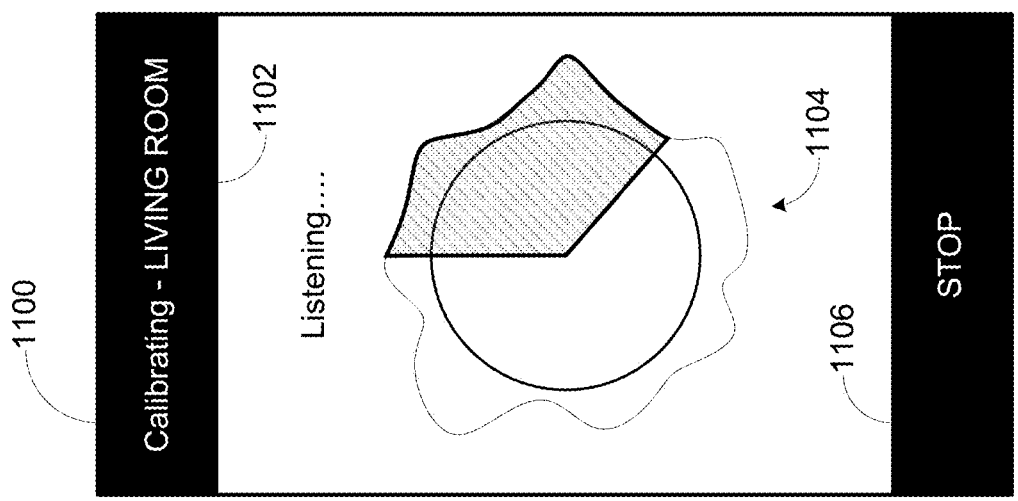
FIG. 11 shows an illustrative playback device calibration user interface.

To illustrate, FIG. 11 shows an example playback device calibration user interface 1100. As shown, the user interface 1100 includes a graphical representation 1102 indicating that one or more playback devices in a "LIVING ROOM" zone is being calibrated. Referring to FIG. 1, such playback devices may include playback devices 104, 106, 108, and/or 110. The user interface 1100 further includes a graphical representation 1104 that may indicate that detecting of an audio signal for calibration purposes is taking place. The graphical representation 1104 may also show a status of the audio signal recording process, such as an amount of the predetermined duration of time for detecting of the calibration tone that has elapsed and/or that is remaining. The graphical representation 1104 may also show a representation of the audio signal that has been detected thus far. Also shown in the user interface 1100 is a selectable icon 1106 that may be selected to terminate the calibration process. One having ordinary skill in the art will appreciate that the user interface 1100 of FIG. 6 is for illustration purposes and that other examples are also possible.

Figure 12:
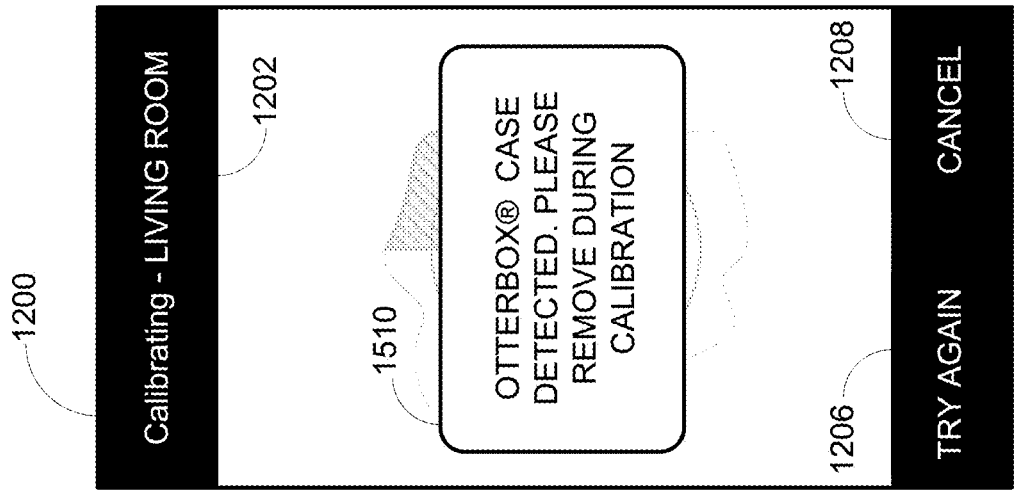
FIG. 12 shows an illustrative playback device calibration user interface.

FIG. 12 shows an illustrative playback device calibration error condition user interface 1200 that may be displayed on the graphical interface when motion has not been validated. As shown, the user interface 1200 includes a graphical representation 1202 indicating that the displayed content on the interface 1200 corresponds to the one or more playback devices in the LIVING ROOM zone.

The user interface 1200 further includes a graphical representation 1210 that may include a message describing detected known impairments or conditions and/or a prompt to remedy the detected impairments or conditions. The user interface 1200 further includes selectable icons 1206 and 1208. Selectable icon 1506 may be selected to try the calibration process again, and selectable icon 1208 may be selected to terminate the calibration process. As shown, the graphical representation 1210 may overlay a grayed or dimmed version of some or all of the graphical representation 604 of the user interface 600 of FIG. 6.

In one example, each type of known impairment or condition may have a corresponding textual message to be provided in the graphical representation 1510. For instance, if the identified impairment corresponds to flint covering the microphone, an example textual message may be "To get a good measurement, make sure your microphone is unobstructed by lint and other material." In another instance, if the identified impairment corresponds to a finger obstructing the microphone, an example textual message may be "It sounds like you were keeping a finger over the microphone. Please try again, but watch those fingers."

The example textual messages discussed herein are for illustrative purposes only and are not meant to be limiting. Further, one having ordinary skill in the art will appreciate that other examples are also possible.

As noted above, some known impairments may affect operation of a recording device or a playback device in predictable ways. In some cases, responses that are characteristic of such impairments may be determined (e.g., when training the neural network). Such responses may be used to correct for the known impairment to allow calibration or other operation of the media playback system to proceed without necessarily removing the impairment. In particular, such responses may be used to offset the impairment.

For instance, after the playback device emits the calibration sound during the calibration interval, the recordings of the calibration sounds may be analyzed to determine calibration settings for the playback device. Such analysis may involve determining a response of the playback device in a given listening area, and determining a calibration profile to offset characteristics of the environment on the apparent response of the playback device. Inverses of such characteristic responses may be applied to the response of the playback device in the given listening area, so as to offset the effect of the impairment on the response measurement.

Some examples techniques for analyzing such recordings are described in U.S. patent application Ser. No. 13/536,493 filed Jun. 28, 2012, entitled "System and Method for Device Playback Calibration," U.S. patent application Ser. No. 14/216,306 filed Mar. 17, 2014, entitled "Audio Settings Based On Environment," and U.S. patent application Ser. No. 14/481,511 filed Sep. 9, 2014, entitled "Playback Device Calibration," which are incorporated herein in their entirety.

VI. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

(Feature 1) A method configured for receiving data indicating a response of one or more playback devices captured by a given microphone, determining an input vector by projecting a response vector that represents the response of the one or more playback devices onto a principle component matrix representing variance caused by one or more calibration impairments, providing the determined input vector to a neural network that includes an output layer comprising neurons that correspond to respective conditions, detecting that the input vector caused one or more neurons of the neural network to fire such that the neural network indicates that one or more particular conditions are affecting the microphone and/or the playback device, and adjusting operation of the one or more playback devices based on the one or more particular conditions.

(Feature 2) The method of feature 1, wherein the conditions comprise calibration impairments and wherein adjusting operation of the one or more playback devices based on the one or more particular conditions comprises to adjusting calibration of the one or more playback devices offset the one or more particular calibration impairments.

(Feature 3) The method of feature 1 in combination with feature 2, wherein adjusting the calibration of the one or more playback devices to offset the one or more particular calibration impairments comprises sending a message that causes the one or more playback devices to abort the calibration.

(Feature 4) The method of feature 1 or 3 in combination with feature 2, wherein adjusting the calibration of the one or more playback devices to offset the one or more particular calibration impairments comprises displaying a prompt to remove the calibration impairments from the microphone.

(Feature 5) The method of feature 1, 3, or 4 in combination with feature 2, wherein adjusting the calibration of the one or more playback devices to offset the one or more particular calibration impairments comprises applying one or more respective correction curves corresponding to the one or more particular calibration impairments to a calibration profile that offsets acoustic characteristics of the given environment to calibrate the one or more playback devices to a calibration equalization.

(Feature 6) The method of feature 1 or any of features 3-5 in combination with feature 2, wherein the neural network includes at least one first neuron corresponding to an absence of calibration impairment and one or more second neurons corresponding to respective calibration impairments, and wherein detecting that the input matrix caused one or more neurons of the neural network to fire comprises determining that the determined input vector did not cause the at least one first neuron to fire, and determining that the input vector caused at least one of the one or more second neurons to fire.

(Feature 7) The method of feature 1 or any of features 3-6 in combination with feature 2, wherein detecting that the input vector caused one or more neurons of the neural network to fire comprises determining that output value of neuron transfer functions corresponding to respective neurons exceed a firing threshold.

(Feature 8) The method of feature 1 or any of features 3-7 in combination with feature 2, wherein detecting that the input vector caused one or more neurons of the neural network to fire comprises detecting that the input vector caused a neuron corresponding to a particular type of recording-device case to fire.

(Feature 9) The method of feature 1 or any of features 3-8 in combination with feature 2, wherein detecting that the input vector caused one or more neurons of the neural network to fire comprises detecting that the input vector caused a neuron corresponding to a particular type of room to fire.

(Feature 10) The method of feature 1 or any of features 3-9 in combination with feature 2, wherein determining the input vector representing the response of the microphone in the given environment comprises identifying a subset of the received data indicating the response of one or more playback devices, the subset corresponding to frequencies affected by the microphone impairments, and determining an response vector that includes components representing the identified subset.

(Feature 11) The method of feature 1 or any of features 3-10 in combination with feature 2, wherein determining the input vector that includes components representing the identified subset comprises converting the received data indicating the response of one or more playback devices from linear spacing to logarithmic spacing, and determining a response vector that includes log-spaced components representing the identified subset.

(Feature 12) The method of feature 1 or any of features 3-11 in combination with feature 2, wherein receiving data indicating the response of the one or more playback devices comprises receiving data indicating a response of one or more first playback devices of a first type in a given environment, and wherein the network device is further configured for determining a difference between the response of the one or more first playback devices and a response corresponding to a second type of playback device, wherein the neural network was trained with a second playback device of the second type, and determining the response vector by determining a product of an inverse of the determined difference and the response of the one or more first playback devices so as to offset type of playback device.

(Feature 13) The method of feature 1 or any of features 3-12 in combination with feature 2, wherein adjusting operation of the playback device to offset the one or more particular conditions comprises interrupting calibration of the playback device, while calibration is interrupted, causing a control device to display a prompt to remove the conditions, and upon receiving an indication that the conditions are removed, continuing calibration of the playback device.

(Feature 14) A network device configured for performing the method of any of features 1 to 13.

(Feature 15) A computer readable medium for performing the method of any of features 10 to 17.

(Feature 16) A method of training a neural network to identify impairments, the method comprising receiving a response matrix that represents, in respective dimensions, responses of a given playback device under respective iterations of a sound captured by a recording device, the iterations including first iterations with respective impairments to the recording device and second iterations without the respective impairments to the recording device, determining principle components representing axes of greatest variance in the response matrix, the principle components comprising respective eigenvectors that include a component for each of the respective iterations, determining a principle-component matrix that represents a given set of the principle components, determining a teaching matrix by projecting the principle-component onto the response matrix, and training a neural network that includes an output layer comprising a neuron for each of the respective impairments by iteratively providing vectors of the training matrix to the neural network.

(Feature 17) The method of claim 16, further comprising storing the trained neural network on a computing system.

(Feature 18) The method of claim 16 or claim 17, wherein receiving the response matrix that represents, in respective dimensions, responses of the given playback device under respective iterations comprises receiving data indicating response vectors for each of the respective iterations and combining the vectors into the response matrix that includes a dimension for each iteration.

(Feature 19) The method of any of claims 16-18, wherein training the neural network comprises determining error between the teaching matrix and output of the neural network, and adjusting respective transfer function factors of the neurons to offset the determined errors.

(Feature 20) The method of any of claims 16-19, wherein the given playback device is a first type of playback device, the method further comprising determining a difference between the response of the given playback device and a response corresponding to a second type of playback device, and determining the response matrix by determining a product of an inverse of the determined difference and the response of the second type of playback device so as to offset type of playback device.

(Feature 21) A network device configured for performing the method of any of features 16 to 20.

(Feature 22) A computing system configured for performing the method of any of features 16 to 20.

(Feature 23) A non-transitory computer readable medium for performing the method of any of features 16 to 20.

We claim:

1. A media playback system comprising:
   one or more playback devices;
   one or more processors; and
   data storage having stored therein instructions executable by the one or more processors to cause the media playback system to perform functions comprising:
   receiving data indicating a response of a listening environment to audio output of the one or more playback devices as captured by one or more microphones;
   determining an input vector for a neural network, wherein determining the input vector comprises projecting a response vector that represents the response onto a principle component matrix representing variance caused by one or more environmental conditions;
   providing the determined input vector to the neural network, the neural network including an output layer comprising neurons that correspond to respective environmental conditions;
   detecting that the input vector caused one or more neurons of the neural network to fire such that the neural network indicates that one or more particular environmental conditions are present in the listening environment; and
   adjusting audio output of the one or more playback devices to at least partially offset the one or more particular environmental conditions.

2. The media playback system of claim 1, wherein detecting that the input vector caused one or more neurons of the neural network to fire comprises detecting that the input vector caused a neuron corresponding to a particular type of room to fire, and wherein adjusting audio output of the one or more playback devices comprises calibrating the one or more playback devices to the particular type of room.

3. The media playback system of claim 1, wherein detecting that the input vector caused one or more neurons of the neural network to fire comprises detecting that the input vector caused a neuron corresponding to a particular size of room to fire, and wherein adjusting audio output of the one or more playback devices comprises calibrating the one or more playback devices to the particular size of room.

4. The media playback system of claim 1, wherein detecting that the input vector caused one or more neurons of the neural network to fire comprises detecting that the input vector caused a neuron corresponding to particular furnishings to fire, and wherein adjusting audio output of the one or more playback devices comprises calibrating the one or more playback devices to the particular furnishings.

5. The media playback system of claim 1, wherein detecting that the input vector caused one or more neurons of the neural network to fire comprises detecting that the input vector caused a neuron corresponding to particular room finishes to fire, and wherein adjusting audio output of the one or more playback devices comprises calibrating the one or more playback devices to the particular room finishes.

6. The media playback system of claim 1, wherein detecting that the input vector caused one or more neurons of the neural network to fire comprises detecting that the input vector caused a neuron corresponding to an outdoors environment to fire, and wherein adjusting audio output of the one or more playback devices comprises calibrating the one or more playback devices to the outdoors environment.

7. The media playback system of claim 1, wherein determining the input vector for the neural network comprises:
   converting the received data indicating the response of the listening environment from linear spacing to logarithmic spacing; and
   determining a particular response vector that includes log-spaced components representing the response of the listening environment.

8. The media playback system of claim 1, wherein the one or more playback devices are a first type of playback device, and wherein determining the input vector comprises:
   determining a difference between the response of the listening environment to audio output of the one or more playback devices and a response corresponding to a second type of playback device, wherein the neural network was trained with the second type of playback device; and
   offsetting the determined difference in the response vector.

9. A method to be performed by a media playback system comprising one or more playback devices, the method comprising:
   receiving data indicating a response of a listening environment to audio output of the one or more playback devices as captured by one or more microphones;
   determining an input vector for a neural network, wherein determining the input vector comprises projecting a response vector that represents the response onto a principle component matrix representing variance caused by one or more environmental conditions;
   providing the determined input vector to the neural network, the neural network including an output layer comprising neurons that correspond to respective environmental conditions;
   detecting that the input vector caused one or more neurons of the neural network to fire such that the neural network indicates that one or more particular environmental conditions are present in the listening environment; and adjusting audio output of the one or more playback devices to at least partially offset the one or more particular environmental conditions.

10. The method of claim 9, wherein detecting that the input vector caused one or more neurons of the neural network to fire comprises detecting that the input vector caused a neuron corresponding to a particular type of room to fire, and wherein adjusting audio output of the one or more playback devices comprises calibrating the one or more playback devices to the particular type of room.

11. The method of claim 9, wherein detecting that the input vector caused one or more neurons of the neural network to fire comprises detecting that the input vector caused a neuron corresponding to a particular size of room to fire, and wherein adjusting audio output of the one or more playback devices comprises calibrating the one or more playback devices to the particular size of room.

12. The method of claim 9, wherein detecting that the input vector caused one or more neurons of the neural network to fire comprises detecting that the input vector caused a neuron corresponding to particular furnishings to fire, and wherein adjusting audio output of the one or more playback devices comprises calibrating the one or more playback devices to the particular furnishings.

13. The method of claim 9, wherein detecting that the input vector caused one or more neurons of the neural network to fire comprises detecting that the input vector caused a neuron corresponding to particular room finishes to fire, and wherein adjusting audio output of the one or more playback devices comprises calibrating the one or more playback devices to the particular room finishes.

14. The method of claim 9, wherein detecting that the input vector caused one or more neurons of the neural network to fire comprises detecting that the input vector caused a neuron corresponding to an outdoors environment to fire, and wherein adjusting audio output of the one or more playback devices comprises calibrating the one or more playback devices to the outdoors environment.

15. The method of claim 9, wherein determining the input vector for the neural network comprises:
converting the received data indicating the response of the listening environment from linear spacing to logarithmic spacing; and
determining a particular response vector that includes log-spaced components representing the response of the listening environment.

16. The method of claim 9, wherein the one or more playback devices are a first type of playback device, and wherein determining the input vector comprises:
determining a difference between the response of the listening environment to audio output of the one or more playback devices and a response corresponding to a second type of playback device, wherein the neural network was trained with the second type of playback device; and
offsetting the determined difference in the response vector.

17. A tangible, non-transitory computer-readable medium having stored therein instructions executable by one or more processors to cause a media playback system to perform functions comprising:
receiving data indicating a response of a listening environment to audio output of one or more playback devices as captured by one or more microphones, wherein the media playback system comprises the one or more playback devices;
determining an input vector for a neural network, wherein determining the input vector comprises projecting a response vector that represents the response onto a principle component matrix representing variance caused by one or more environmental conditions;
providing the determined input vector to the neural network, the neural network including an output layer comprising neurons that correspond to respective environmental conditions;
detecting that the input vector caused one or more neurons of the neural network to fire such that the neural network indicates that one or more particular environmental conditions are present in the listening environment; and
adjusting audio output of the one or more playback devices to at least partially offset the one or more particular environmental conditions.

18. The tangible, non-transitory computer-readable medium of claim 17, wherein detecting that the input vector caused one or more neurons of the neural network to fire comprises detecting that the input vector caused a neuron corresponding to a particular type of room to fire, and wherein adjusting audio output of the one or more playback devices comprises calibrating the one or more playback devices to the particular type of room.

19. The tangible, non-transitory computer-readable medium of claim 17, wherein detecting that the input vector caused one or more neurons of the neural network to fire comprises detecting that the input vector caused a neuron corresponding to a particular size of room to fire, and wherein adjusting audio output of the one or more playback devices comprises calibrating the one or more playback devices to the particular size of room.

20. The tangible, non-transitory computer-readable medium of claim 17, wherein detecting that the input vector caused one or more neurons of the neural network to fire comprises detecting that the input vector caused a neuron corresponding to particular furnishings to fire, and wherein adjusting audio output of the one or more playback devices comprises calibrating the one or more playback devices to the particular furnishings.

* * * * *